United States Patent [19]
Kato et al.

[11] Patent Number: 5,439,789
[45] Date of Patent: * Aug. 8, 1995

[54] METHINE COMPOUND AND SILVER HALIDE PHOTOGRAPHIC MATERIAL COMPRISING THE SAME

[75] Inventors: Takashi Kato; Kiyohito Takada, both of Kanagawa, Japan

[73] Assignee: Fuji Photo Film Co., Ltd., Kanagawa, Japan

[*] Notice: The portion of the term of this patent subsequent to Jul. 18, 2006 has been disclaimed.

[21] Appl. No.: 240,462

[22] Filed: May 10, 1994

[30] Foreign Application Priority Data

May 11, 1993 [JP] Japan .................................. 5-132457

[51] Int. Cl.⁶ .............................................. G03C 1/18
[52] U.S. Cl. .................... 430/585; 430/581; 430/583; 430/584; 430/588; 430/590
[58] Field of Search ............... 430/585, 588, 581, 583, 430/584, 590

[56] References Cited

U.S. PATENT DOCUMENTS 4,789,626 12/1988 Sakanoue et al. .

FOREIGN PATENT DOCUMENTS 0287100 10/1988 European Pat. Off. .
2303204 8/1973 Germany .
675654 10/1953 United Kingdom .

Primary Examiner—Thorl Chea
Attorney, Agent, or Firm—Sughrue, Mion, Zinn, Macpeak & Seas

[57] ABSTRACT

A silver halide photographic material is disclosed which comprises at least one of methine compounds represented by the following formula (I)

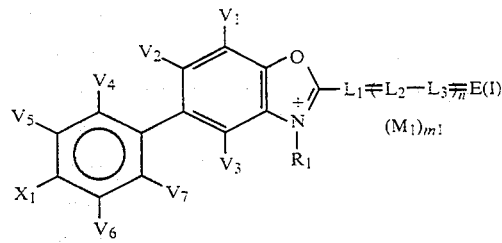

wherein $R_1$ represents a substituted or unsubstituted alkyl group; $V_1$, $V_2$, $V_3$, $V_4$, $V_5$, $V_6$ and $V_7$ are the same or different and each represents a hydrogen atom or a substituent; $X_1$ represents a halogen atom; $L_1$, $L_2$ and $L_3$ are the same or different and each represents a substituted or unsubstituted methine group; E represents an auxochrome; n represents a number of 0 or more; $M_1$ represents an ion for neutralizing charge; and $m_1$ represents a number of 0 or more necessary for neutralizing the molecular charge.

10 Claims, No Drawings

METHINE COMPOUND AND SILVER HALIDE PHOTOGRAPHIC MATERIAL COMPRISING THE SAME

FIELD OF THE INVENTION

This invention relates to a methine compound and a silver halide photographic material comprising the methine compound. More particularly, it relates to a methine dye having a benzoxazole nucleus having a halogen-substituted aryl group at the 5-position and a silver halide photographic material comprising the methine dye.

BACKGROUND OF THE INVENTION

Spectral sensitization is a very important, essential technique in the preparation of high-sensitivity and stable silver halide photographic materials. Many spectral sensitizers have been developed, and the practical application methods of them with regard to, for example, supersensitization methods, addition methods, have been developed.

Conventional spectral sensitizing dyes used in conducting spectral sensitization include spectral sensitizers such as cyanine dyes, merocyanine dyes and rhodacyanine dyes. It is known that these spectral sensitizers are used either alone or in combination (e.g., for the purpose of supersensitization).

The sensitizing dyes used in photographic materials must meet many requirements. For example, not only high spectral sensitivity can be provided, but also fog is not to be increased. It is necessary that the sensitizing dyes have excellent exposure characteristics (e.g., latent image stability, reciprocity law characteristics, temperature or humidity dependency during exposure), hardly cause a change in sensitivity, gradation and fog during the storage of the photographic materials before exposure and are not left behind in the photographic materials after processing.

Particularly, it is an essential factor that the sensitizing dyes are highly stable during the storage of the photographic materials. Many attempts have been made to provide sensitizing dyes satisfying the above requirements.

Conventionally, photographic emulsions containing oxacarbocyanine dyes alone (e.g., described in U.S. Pat. Nos. 2,173,486, 2,521,706 and 3,044,875, and JP-A-63-167348 (the term "JP-A" as used herein means an "unexamined published Japanese patent application")), photographic emulsions containing a combination of oxacarbocyanine dyes and imidadicarbocyanine dyes (e.g., described in JP-A-59-116646, JP-A-59-116647, JP-A-59-140443 and JP-A-59-149346) and photographic emulsions containing a combination of two or more of oxacarbocyanine dyes are known as silver halide photographic emulsions having spectral sensitivity in the wavelength region of green light. However, the storage stability thereof has not been sufficient.

Further, it is important that various dyes are added to the silver halide photographic materials to improve sharpness and an ability of color separation.

Supersensitization is described in *Photographic Science and Engineering*, vol. 13, pp. 13–17 (1969), ibid. vol. 18, pp. 418–430 (1974) and James, *The Theory of the Photographic Process*, the fourth edition, page 259 (Macmillan 1977). It is known that high sensitivity can be obtained by selecting appropriate sensitizing dyes and supersensitizing dyes.

Dyes having a benzoxazole nucleus having a substituted aryl group at the 5-position of the nucleus are disclosed in U.K. Patent 675,654. The dyes have such a structure having a phenyl group at the 5-position, and an alkoxy group or an alkyl group at the para-position of the phenyl group as follows:

Conventional Dye A:

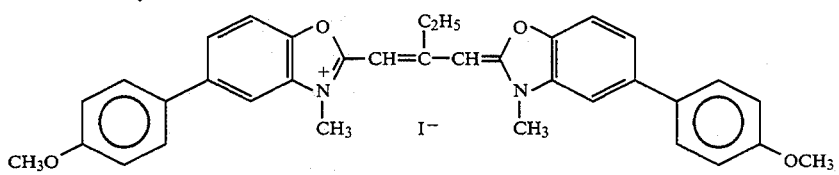

Conventional Dye B:

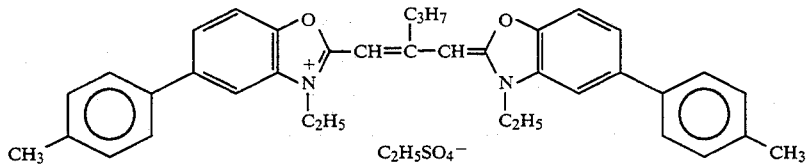

Namely, a dye having a benzoxazole nucleus substituted at the 5-position of the nucleus by a halogen-substituted aryl group at the para-position of the aryl group has not been conventionally known.

SUMMARY OF THE INVENTION

An object of the present invention is to provide a novel methine compound.

Another object of the present invention is to provide a silver halide photographic material which hardly causes a change in sensitivity during the storage thereof (that is, which has excellent long-term storage stability).

Still another object of the present invention is to provide a silver halide photographic material comprising a dye which does not have the problem associated with prior art.

These and other objects of the present invention have been achieved by (1) a silver halide photographic material comprising at least one methine compound represented by the following formula (I):

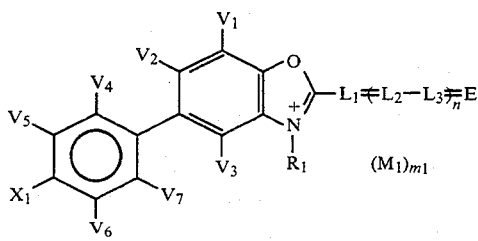

(I)

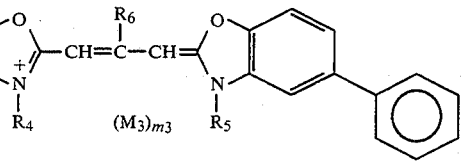

(III)

wherein $R_1$ represents a substituted or unsubstituted alkyl group; $V_1$, $V_2$, $V_3$, $V_4$, $V_5$, $V_6$ and $V_7$ are the same or different and each represents a hydrogen atom or a substituent; $X_1$ represents a halogen atom; $L_1$, $L_2$ and $L_3$ are the same or different and each represents a substituted or unsubstituted methine group; E represents an auxochrome; n represents a number of 0 or more; $M_1$ represents an ion for neutralizing charge; and $m_1$ represents a number of 0 or more necessary for neutralizing the molecular charge; or (2) a methine compound represented by formula (I) as described in (1) above.

Preferably, these and other objects of the present invention have been achieved by (3) a silver halide photographic material as described in (1) above, wherein the silver halide photographic material comprises a support having thereon at least one silver halide emulsion layer having a silver chloride content of 90 mol % or more, and a silver halide emulsion contained in at least one layer of the silver halide emulsion layers having a silver chloride content of 90 mol % or more comprises at least one of the methine compounds represented by formula (I);

(4) a silver halide photographic material as described in (3) above, wherein the methine compound represented by formula (I) is a compound represented by the following formula (II):

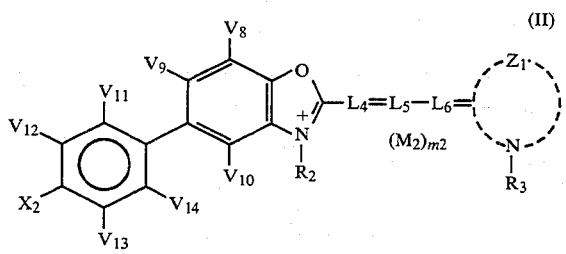

(II)

wherein $R_2$ and $R_3$ are the same or different and each represents a substituted or unsubstituted alkyl group; $Z_1$ represents an atomic group necessary for forming a five-membered or six-membered nitrogen-containing heterocyclic ring; $V_8$, $V_9$, $V_{10}$, $V_{11}$, $V_{12}$, $V_{13}$ and $V_{14}$ are the same or different and each represents a hydrogen atom or a substituent; $X_2$ represents a halogen atom; $L_4$, $L_5$ and $L_6$ are the same or different and each represents a substituted or unsubstituted methine group; $M_2$ represents an ion for neutralizing charge; and $m_2$ represents a number of 0 or more necessary for neutralizing the molecular charge;

(5) a silver halide photographic material as described in (3) above, wherein the silver halide photographic material comprises at least one compound represented by formula (II) and at least one compound represented by the following formula (III):

wherein $R_4$ and $R_5$ are the same or different and each represents a substituted or unsubstituted alkyl group; $R_6$ represents a hydrogen atom or a substituted or unsubstituted alkyl group; $M_3$ represents an ion for neutralizing charge; and $m_3$ represents a number of 0 or more necessary for neutralizing the molecular charge; or (6) the methine compound as described in (2) above, wherein the methine compound described in (2) above is the compound represented by formula (II) described in (4) above.

DETAILED DESCRIPTION OF THE INVENTION

The compounds represented by formulae (I), (II) and (III) will be described in greater detail below.

In formulae (I), (II) and (III), $R_1$, $R_2$, $R_3$, $R_4$ and $R_5$ ($R_1$ to $R_5$) are each preferably an unsubstituted alkyl group having from 1 to 18 carbon atoms (e.g., methyl, ethyl, propyl, butyl, pentyl, hexyl, heptyl, octyl, decyl, dodecyl, octadecyl) or a substituted alkyl group having from 1 to 18 carbon atoms substituted by, for example, one or more of a carboxyl group, a sulfo group, a cyano group, a halogen atom (e.g., fluorine, chlorine, bromine), a hydroxyl group, an alkoxycarbonyl group having from 2 to 8 carbon atoms (e.g., methoxycarbonyl, ethoxycarbonyl, phenoxycarbonyl, benzyloxycarbonyl), an alkoxy group having from 1 to 8 carbon atoms (e.g., methoxy, ethoxy, benzyloxy, phenethyloxy), an aryloxy group having from 6 to 15 carbon atoms (e.g., phenoxy, p-tolyloxy, α-naphthoxy), an acyloxy group having from 2 to 8 carbon atoms (e.g., acetyloxy, propionyloxy), an acyl group having from 2 to 8 carbon atoms (e.g., acetyl, propionyl, benzoyl), a carbamoyl group having from 1 to 8 carbon atoms (e.g., carbamoyl, N,N-dimethylcarbamoyl, morpholinocarbonyl, piperidinocarbonyl), a sulfamoyl group having from 0 to 8 carbon atoms (e.g., sulfamoyl, N,N-dimethylsulfamoyl, morpholinosulfonyl, piperidinosulfonyl), an aryl group having from 6 to 15 carbon atoms (e.g., phenyl, 4-chlorophenyl, 4-methylphenyl, α-naphthyl), a sulfonylcarbamoyl group having from 2 to 8 carbon atoms or an acylsulfamoyl group having from 2 to 8 carbon atoms.

More preferably, $R_1$ to $R_5$ are each an unsubstituted alkyl group having from 2 to 5 carbon atoms (e.g., ethyl, propyl) or a sulfoalkyl group having from 2 to 5 carbon atoms (e.g., 2-sulfoethyl, 3-sulfopropyl, 4-sulfobutyl). Most preferably, each of $R_1$ to $R_5$ is a sulfoalkyl group having from 2 to 5 carbon atoms.

$R_6$ is a hydrogen atom or a substituted or unsubstituted alkyl group. Examples of the substituted or unsubstituted alkyl group include those already described above in the definition of $R_1$ to $R_5$. $R_6$ is preferably an unsubstituted alkyl group (e.g., methyl, ethyl, propyl), and more preferably a methyl group, an ethyl group or a propyl group.

$V_1$, $V_2$, $V_3$, $V_4$, $V_5$, $V_6$, $V_7$, $V_8$, $V_9$, $V_{10}$, $V_{11}$, $V_{12}$, $V_{13}$ $V_{14}$ ($V_1$ to $V_{14}$) are the same or different and each represents a hydrogen atom or a substituent. Examples of the substituent include an unsubstituted alkyl group having from 1 to 18 carbon atoms (e.g., methyl, ethyl, propyl, butyl, pentyl), a substituted alkyl group having from 1 to 28 carbon atoms (e.g., benzyl, α-naphthylmethyl, trifluoromethyl, methoxymethyl, ethoxymethyl), an alkenyl group having from 2 to 18 carbon atoms (e.g., ethenyl, propenyl, butenyl), an alkynyl group having from 2 to 18 carbon atoms (e.g., ethynyl, propynyl, phenylethynyl), an aryl group having from 6 to 15 carbon atoms (e.g., phenyl, tolyl, α-naphthyl, xylyl), a halogen atom (e.g., fluorine, chlorine, bromine, iodine), an alkoxy group having from 1 to 18 carbon atoms (e.g., methoxy, ethoxy, phenoxy, benzyloxy), an amino group having from 0 to 18 carbon atoms (e.g., N,N-diphenylamino, N-methyl-N-phenylamino, N-methylpiperazino), an acyl group having from 2 to 8 carbon atoms (e.g., acetyl, benzoyl), an acyloxy group having from 2 to 10 carbon atoms (e.g., acetyloxy), an alkoxycarbonyl group having from 2 to 18 carbon atoms (e.g., methoxycarbonyl, ethoxycarbonyl, benzyloxycarbonyl), a carbamoyl group having from 1 to 18 carbon atoms (e.g., carbamoyl, N,N-dimethylcarbamoyl, morpholinocarbamoyl, piperidinocarbamoyl), a sulfamoyl group having from 0 to 18 carbon atoms (e.g., sulfamoyl, N,N-dimethylsulfamoyl, morpholinosulfamoyl, piperidinosulfamoyl), a carboxyl group, a cyano group, a hydroxyl group, an alkylthio group having from 1 to 18 carbon atoms (e.g., methylthio, ethylthio) and an alkylsulfonyl group having from 1 to 18 carbon atoms (e.g., methylsulfonyl).

$V_1$ to $V_{14}$ are each preferably a hydrogen atom, an alkyl group, a halogen atom, an alkoxy group or an aryl group and more preferably a hydrogen atom.

$X_1$ and $X_2$ are the same or different and each represents a halogen atom (e.g., fluorine, chlorine, bromine, iodine) and preferably a chlorine atom or a bromine atom.

$L_1$, $L_2$, $L_3$, $L_4$, $L_5$ and $L_6$ ($L_1$ to $L_6$) are the same or different and each represents a methine group which may be substituted by, for example, one or more of a substituted or unsubstituted alkyl group (e.g., methyl, ethyl, 2-carboxyethyl), a substituted or unsubstituted aryl group (e.g., phenyl), a halogen atom (e.g., chlorine), a substituted or substituted alkoxy group (e.g., methoxy, ethoxy) and a substituted or unsubstituted amino group (e.g., N,N-diphenylamino, N-methyl-N-phenylamino, N-methylpiperazino). $L_1$ to $L_6$ each may be combined together with other methine group or an auxochrome to form a ring. $L_1$ to $L_6$ are each preferably an unsubstituted methine group or a methine group substituted by an alkyl group.

E may be in a form which is conventionally used as a moiety in the structures of the methine dyes. Specifically, the auxochrome comprises a nitrogen atom- or chalcogen atom-containing moiety and is in the resonance state between charged state and uncharged state in the dye. For example, E may be in any form of the auxochromes found in the cyanine, merocyanine, oxonol, pyrylium and thiapyrylium dyes, though the auxochromes are not limited to these groups. Further, auxochromes comprising other atom (e.g., phosphorus or boron)-containing moiety may be used, though these auxochromes are conventionally not so often used. Examples of the auxochrome include 2-triphenylphosphoro-1,3-cyclopentadiene-5-yl.

In formula (I), n represents a number of 0 or more, preferably 0, 1, 2 or 3, and more preferably 1.

Examples of the nucleus formed by $Z_1$ include a thiazole nucleus [for example, a thiazole nucleus (e.g., thiazole, 4-methylthiazole, 4-phenylthiazole, 4,5-di-methylthiazole, 4,5-diphenylthiazole), a benzothiazole nucleus (e.g., benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylbenzothiazole, 5,6-dimethoxybenzothiazole, 5-hydroxy-6-methylbenzothiazole, tetrahydrobenzothiazole, 4-phenylbenzothiazole, 5,6-bismethylthiobenzothiazole), a naphthothiazole nucleus (e.g., naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3-d]thiazole)]; a thiazoline nucleus (for example, thiazoline, 4-methylthiazoline, 4-nitrothiazoline); an oxazole nucleus [for example, an oxazole nucleus (e.g., oxazole, 4-methyloxazole, 4-nitrooxazole, 5-methyloxazole, 4-phenyloxazole, 4,5-diphenyloxazole, 4-ethyloxazole), a benzoxazole nucleus (e.g., benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenzoxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole), a naphthoxazole nucleus (e.g., naphtho[2,1-d]oxazole, naphtho[1,2-d]-oxazole, naphtho[2,3-d]oxazole, 5-nitronaphtho[2,1-d]-oxazole)]; an oxazoline nucleus (for example, 4,4-dimethyloxazoline); a selenazole nucleus [for example, a selenazole nucleus (e.g., 4-methylselenazole, 4-nitroselenazole, 4-phenylselenazole), a benzoselenazole nucleus (e.g. benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole, 5,6-dimethylbenzoselenazole), a naphthoselenazole nucleus (e.g., naphtho[2,1-d]selenazole, naphtho[1,2-d]selenazole)]; a seienazoline nucleus (for example, selenazoline, 4-methylselenazoline); a quinoline nucleus [for example, a quinoline nucleus (e.g., 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, 6-methyl-4-quinoline, 6-methoxy-5-quinoline, 6-chloro-4-quinoline, 5,6-dimethyl-4-quinoline), an isoquinoline nucleus (e.g., 6-nitro-1-isoquinoline, 3,4-dihydro-1-isoquinoline, 6-nitro-3-isoquinoline)]; a tellurazole nucleus (for example, 5,6-dimethylbenzotellurazole); an imidazole nucleus [for example, an imidazole nucleus (e.g., 1-alkylimidazole, 1-alkyl-4-phenylimidazole, 1-arylimidazole), a benzimidazole nucleus (e.g., 1-alkylbenzimidazole, 1-alkyl-5-chlorobenzimidazole, 1-alkyl-5,6-dichlorobenzimidazole, 1-alkyl-5-methoxybenzimidazole, 1-alkyl-5-cyanobenzimidazole, 1-alkyl-5-fluorobenzimidazole, 1-alkyl-5-trifluoromethylbenzimidazole, 1-alkyl-6-chloro-5-cyanobenzimidazole, 1-alkyl-6-chloro-5-trifloromethylbenzimidazole, 1-allyl-5,6-dichorobenzimidazole, 1-allyl-5-chlorobenzimidazole, 1-arylbenzimidazole, 1-aryl-5-chlorobenzimidazole, 1-aryl-5,6-dichlorobenzimidazole, 1-aryl-5-methoxybenzimidazole, 1-aryl-5-cyanobenzimidazole), a naphthoimidazole nucleus (e.g., 1-alkylnaphtho[1,2-d]imidazole, 1-arylnaphtho-[1,2-d]imidazole); wherein the above-described alkyl group has preferably from 1 to 8 carbon atoms; and the alkyl group is preferably an unsubstituted alkyl group such as methyl, ethyl, propyl, isopropyl and butyl or a hydroxyalkyl group such as 2-hydroxyethyl and 3-hydroxypropyl, and more preferably a methyl group or an ethyl group; and wherein examples of the above-described aryl group include a phenyl group, a halogen-substituted phenyl group such as chlorophenyl, an alkyl-substituted phenyl group such as methylphenyl and an alkoxy-substituted phenyl group such as methoxyphenyl]; a pyridine nucleus (for example, 2-pyridine, 4-pyridine, 5-methyl-2-pyridine, 3-methyl-4-pyridine); an imidazo[4,5-b]quinoxaline nucleus (e.g., 1,3-diethylimidazo-[4,5-b]quinoxaline, 6-chloro-1,3-diallylimidazo[4,5-b]quinoxaline); an oxadiazole nucleus; a thiadiazole nucleus; a tetrazole nucleus; and a pyrimidine nucleus.

The nucleus formed by $Z_1$ is preferably a benzthiazole nucleus, a naphthothiazole nucleus, a benzoxazole nucleus, a naphthoxazole nucleus or a benzimidazole nucleus, more preferably a benzoxazole nucleus, and most preferably 5-phenylbenzoxazole, 5-(4-chlorophenyl)benzoxazole or 5-(4-bromophenyl)benzoxazole.

$M_1$, $M_2$, $M_3$, $m_1$, $m_2$ and $m_3$ are included in the formulae to show the presence or absence of a cation or an anion when the ionic charge of the dye is to be neutralized. Whether a dye is a cation or an anion or has no net ionic charge varies depending on the type of the auxochrome and the substituents.

Specific examples of the cation include ammonium ions and alkali metal ions. The anion may be any of inorganic anions and organic anions. Examples of the anion include a halide ion (e.g., fluorine ion, chloride ion, bromide ion, iodide ion), a substituted arylsulfonate ion (e.g., p-toluenesulfonate ion, p-chlorobenzenesulfonate ion), an aryldisulfonate ion (e.g., 1,3-benzenedisulfonate ion, 1,5-naphthalenedisulfonate ion, 2,6-naphthalenedisulfonate ion), an alkylsulfate ion (e.g., methylsulfate ion), a sulfate ion, a thiocyanate ion, a perchlorate ion, a tetrafluoroborate ion, a picrate ion, an acetate ion and a trifluoromethanesulfonate ion. $M_1$, $M_2$ and $M_3$ each may be an ion for neutralizing two or more ionic charges.

The cations represented by $M_1$, $M_2$ and $M_3$ are preferably a sodium ion, a potassium ion, a triethylammonium ion, a pyridinium ion, a tetraethylammonium ion, an ethylpyridinium ion or a methylpyridinium ion.

The anions represented by $M_1$, $M_2$ and $M_3$ are preferably a perchlorate ion, an iodide ion, a bromide ion or a substituted arylsulfonate ion (e.g., p-toluenesulfonate ion).

Specific examples of the compounds represented by formulae (I) and (II) which can be used in present invention include, but are not limited to, the following compounds. In the following formulae, Me, Et, Ac and Ph represent a methyl group, an ethyl group, an acetyl group and a phenyl group, respectively.

| No. | X | V | $R_1$ | $R_2$ | $R_3$ | M |
|---|---|---|---|---|---|---|
| I-1 | —Cl | —H | Et | Et | Et | I— |
| I-2 | " | 5-Cl | —(CH$_2$)$_4$SO$_3$— | —(CH$_2$)$_3$SO$_3$— | " | Na$^+$ |
| I-3 | " | 5-Ph | " | " | Me | $^+$HN(C$_2$H$_5$)$_3$ |
| I-4 | " | 4,5-benzo | Et | " | " | — |
| I-5 | —Br | —H | " | Et | " | I$^-$ |
| I-6 | " | 5-Cl | —(CH$_2$)$_2$CO$_2$H | " | Et | I$^-$ |
| I-7 | " | 5-Br | —(CH$_2$)$_4$SO$_3$— | —(CH$_2$)$_4$SO$_3$— | —H | K$^+$ |
| I-8 | " | 5-OMe | —(CH$_2$)$_2$SO$_3$— | " | Et | Na$^+$ |
| I-9 | —F | —H | " | —(CH$_2$)$_3$SO$_3$— | " | " |
| I-10 | —I | 5-I | " | " | " | " |

| No. | X | R | M |
|---|---|---|---|

-continued

| No. | X | R | M |
|---|---|---|---|
| I-11 | —Cl | —(CH₂)₂SO₃— | pyridinium (HN+) |
| I-12 | " | —(CH₂)₃SO₃— | N-ethylpyridinium (C₂H₅N+) |
| I-13 | " | —(CH₂)₄SO₃— | " |
| I-14 | " | —(CH₂)₄SO₃— | pyridinium (HN+) |
| I-15 | " | –(CH₂)₂CH(CH₃)SO₃– | Na⁺ |
| I-16 | " | Et | I⁻ |
| I-17 | " | —CH₂CONHSO₂CH₃ | Br⁻ |
| I-18 | " | —(CH₂)₂NHSO₂CH₃ | " |
| I-19 | " | —(CH₂)₂OCH₃ | ClO₄⁻ |
| I-20 | " | —(CH₂)₂O-(1-naphthyl) | CH₃-C₆H₄-SO₃⁻ |

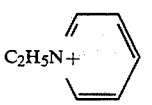

| No. | X | R | M |
|---|---|---|---|
| I-21 | —Br | —(CH₂)₂SO₃— | pyridinium (HN+) |
| I-22 | " | —(CH₂)₃SO₃— | " |
| I-23 | " | —(CH₂)₄SO₃— | N-ethylpyridinium (C₂H₅N+) |
| I-24 | " | –(CH₂)₂CH(CH₃)SO₃– | pyridinium (HN+) |
| I-25 | " | Et | I⁻ |
| I-26 | " | —CH₂CONHSO₂CH₃ | Br⁻ |
| I-27 | " | —(CH₂)₂NH₂ | I⁻ |
| I-28 | " | —(CH₂)₂OAc | " |
| I-29 | —F | —(CH₂)₂SO₃— | pyridinium (HN+) |

|  |  |  |  |  |  |  |
|---|---|---|---|---|---|---|
| I-30 | " | −(CH$_2$)$_4$SO$_3$− |  |  |  | 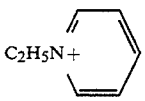 C$_2$H$_5$N+ |

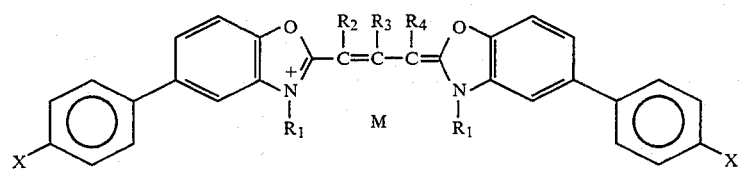

| No. | X$_1$ | X$_2$ | R$_1$ | R$_2$ | R$_3$ | R$_4$ | M |
|---|---|---|---|---|---|---|---|
| I-31 | −Cl | −Cl | −(CH$_2$)$_2$SO$_3$− | −CH$_3$ | −H | −H | Na+ |
| I-32 | " | " | " | −CH$_3$ | " | −CH$_3$ | " |
| I-33 | " | −OCH$_3$ | −(CH$_2$)$_4$SO$_3$− | −H | −C$_2$H$_5$ | −H | " |
| I-34 | −Br | −Cl | " | −H | " | " | HN+ <br> (pyridinium) |
| I-35 | " | −CH$_3$ | " | −CH$_3$ | −H | " | " |
| I-36 | −I | −I | −C$_2$H$_5$ | " | " | −CH$_3$ | I− |
| I-37 | −F | −Cl | " | −C$_2$H$_5$ | " | −H | " |
| I-38 | −Br | −Br | −(CH$_2$)$_2$CO$_2$H | −H | " | " | Br− |
| I-39 | " | " | " | " | −CH$_3$ | " | " |
| I-40 | " | −OH | −C$_2$H$_5$ | " | −C$_2$H$_5$ | " | I− |

(I-41)

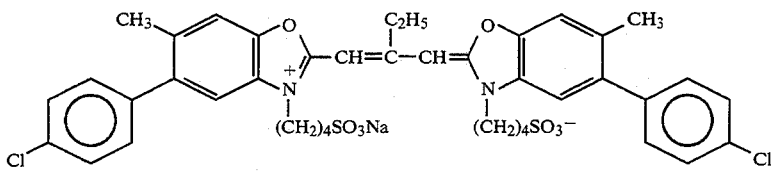

(I-42)

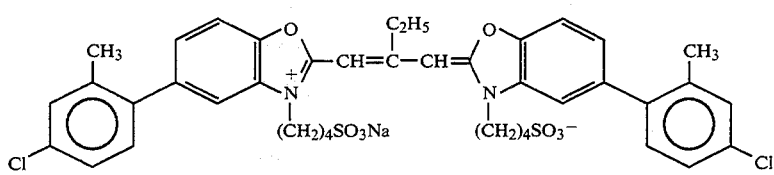

(I-43)

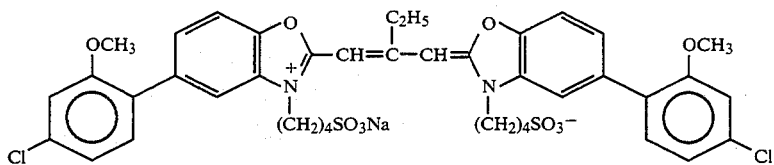

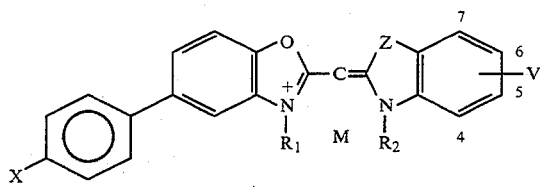

| No. | X | R$_1$ | R$_2$ | Z | V | M |
|---|---|---|---|---|---|---|
| I-44 | −Cl | −(CH$_2$)$_4$SO$_3$− | −(CH$_2$)$_4$SO$_3$− | −O− | 5-Cl | 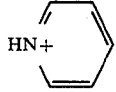 HN+ |

-continued
| | | | | | |
|---|---|---|---|---|---|
| I-45 | " | —(CH₂)₂SO₃— | " | —S— | " | " |
| I-46 | —Br | " | " | —O— | " | " |
| I-47 | " | " | —(CH₂)₄SO₃— | —S— | 5-Br | Na⁺ |
| I-48 | —F | " | " | " | " | " |
(I-49)
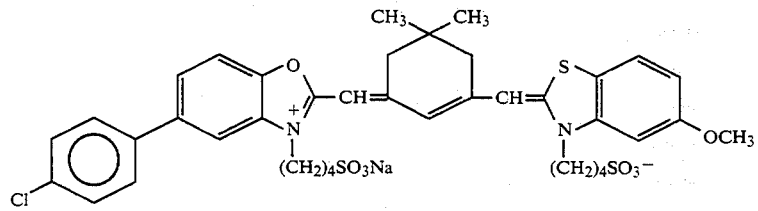
(I-50)
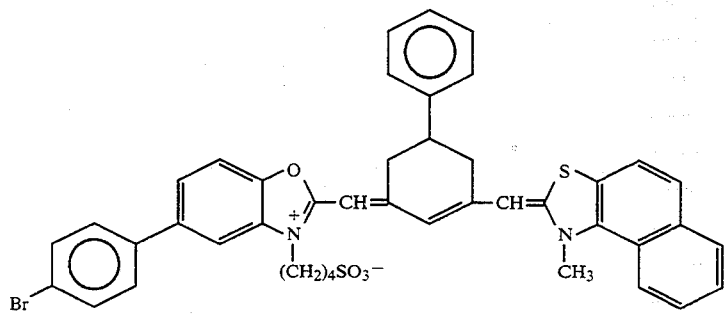
(I-51)
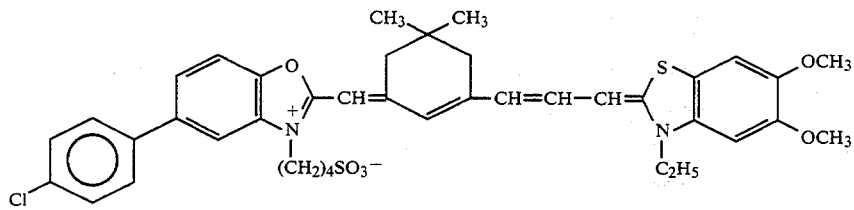
(I-52)
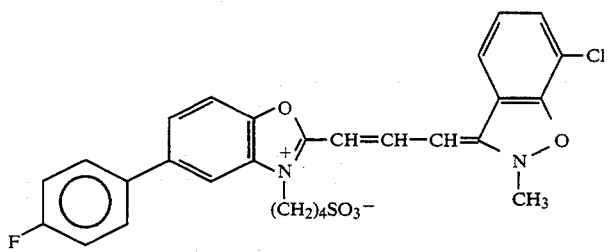
(I-53)
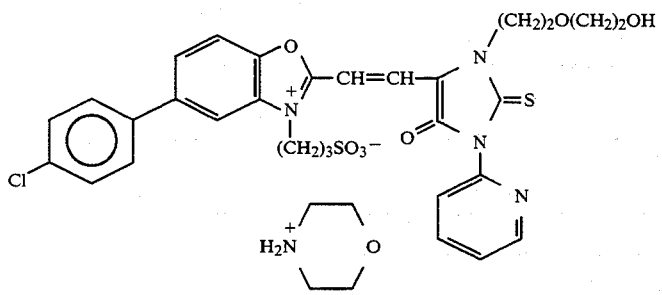

-continued

| No. | X | Z | $R_1$ | $R_2$ | $R_3$ | V | M |
|---|---|---|---|---|---|---|---|
| I-54 | —Cl | —N—Et | —(CH$_2$)$_4$SO$_3^-$ | —(CH$_2$)$_2$SO$_3^-$ | —H | 5-Cl, 6-Cl | Na$^+$ |
| I-55 | " | —S— | " | " | Me | 5-Cl | " |
| I-56 | " | " | —C$_2$H$_5$ | " | Et | " | — |
| I-57 | —Br | —N—Et | —(CH$_2$)$_2$SO$_3^-$ | " | —H | 5-Cl, 6-Cl | Na$^+$ |
| I-58 | " | —S— | " | " | " | 5-OMe | K$^+$ |
| I-59 | " | —Se— | " | " | " | 5-Cl | " |
| I-60 | —F | —N—Et | " | —(CH$_2$)$_3$SO$_3^-$ | Et | " | " |
| I-61 | —Cl | —S— | —(CH$_2$)$_2$CO$_2$H | " | " | 5-Br | — |

Specific examples of the compounds represented by formula (III) include, but are not limited to, the following compounds

| No. | $R_1$ | $R_2$ | $R_3$ | M |
|---|---|---|---|---|
| III-1 | —(CH$_2$)$_2$SO$_3^-$ | Et | —(CH$_2$)$_2$SO$_3^-$ | pyridinium (HN$^+$) |
| III-2 | " | " | " | C$_2$H$_5$N$^+$ pyridinium |
| III-3 | —(CH$_2$)$_4$SO$_3^-$ | Me | —(CH$_2$)$_4$SO$_3^-$ | " |
| III-4 | " | Et | " | pyridinium (HN$^+$) |
| III-5 | ⁺(CH$_2$)$_2$CHSO$_3^-$<br>  \|<br>  CH$_3$ | " | ⁺(CH$_2$)$_2$CHSO$_3^-$<br>  \|<br>  CH$_3$ | HN(C$_2$H$_5$)$_3^+$ |
| III-6 | —(CH$_2$)$_2$OAc | —H | —(CH$_2$)$_2$OAc | Br$^-$ |
| III-7 | (CH$_2$)$_2$CO$_2$H | Me | —(CH$_2$)$_2$CO$_2$H | " |
| III-8 | —(CH$_2$)$_3$SO$_3^-$ | Et | —(CH$_2$)$_3$SO$_3^-$ | Na$^+$ |

The polymethine compounds represented by formulae (I), (II) and (III) which are used in the present invention can be synthesized by using the methods described in the following literature references or by referring thereto:

(a) F. M. Hamer, *Heterocyclic Compounds—Cyanine Dyes and Related Compounds—*, (John Wiley & Sons, New York, London, 1964);

(b) D. M. Sturmer, *Heterocyclic Compounds—Special Topics in Heterocyclic Chemistry—*, Chapter 8, Paragraph 4, pp. 482–515 (John Wiley & Sons, New York, London, 1977).

The methine compounds and other sensitizing dyes used in the present invention may be added to the silver halide emulsion according to the present invention at any stage conventionally considered to be effective during the course of the preparation of the emulsion. For example, the sensitizing dyes may be added before the formation of silver halide grains and/or desalting stage, or during the desalting stage and/or before the commencement of chemical sensitization after desalting as described in U.S. Pat. Nos. 2,735,766, 3,628,960, 4,183,756 and 4,225,666, JP-A-58-184142 and JP-A-60-196749, or may be added immediately before or during chemical ripening or at any stage before the coating of the emulsions after chemical ripening as described in JP-A-58-113920. Further, one compound alone or a combination of two or more compounds may be added portionwise, for example, during the formation of the grains and during chemical ripening or after completion of chemical ripening as described in U.S. Pat. No. 4,225,666 and JP-A-58-7629. If desired the type of the compound to be portionwise added or the combination of the compounds to be portionwise added may be varied.

The amounts of the methine compounds represented by formulae (I) or (II) to be added vary depending on the form and size of the silver halide grains, but are generally from $4 \times 10^{-6}$ to $8 \times 10^{-2}$ mol, preferably from $3 \times 10^{-6}$ to $2.5 \times 10^{-3}$ mol, per mol of silver halide.

The amounts ratio of the compounds represented by formula (III) to the methine compounds represented by formula (II) is generally from 1/20 to 100/1, preferably from 1/10 to 10/1.

The methine compounds and other sensitizing dyes used in the present invention may be directly dispersed in the emulsions. Alternatively, the sensitizing dyes may be dissolved in a solvent such as methyl alcohol, ethyl alcohol, methyl cellosolve, acetone, water or pyridine or in a solvent mixture thereof, and the resulting solution may be added to the emulsions. The dyes may be dissolved in the presence of additives such as a base, an acid or a surfactant or by using an ultrasonic wave. Examples of methods for adding the sensitizing dyes include: a method wherein the dyes are dissolved in a volatile organic solvent, the resulting solution is dispersed in hydrophilic colloid, and the resulting dispersion is added to the emulsions as described in U.S. Pat. No. 3,469,987; a method wherein water-insoluble dyes are dispersed in a water-soluble solvent without dissolving the dyes, and the resulting dispersion is added to the emulsions as described in JP-B-46-24185; a method wherein the dyes are dissolved in a surfactant, and the resulting solution is added to the emulsions as described in U.S. Pat. No. 3,822,135; a method wherein the dyes are dissolved by using a compound which allows red shift to be caused, and the resulting solution is added to the emulsions as described in JP-A-51-74624; and a method wherein the dyes are dissolved in an acid which is substantially free from water, and the resulting solution is added to the emulsions. Further, the dyes can be added to the emulsions by using the methods described in U.S. Pat. Nos. 2,912,343, 3,342,605, 2,996,287 and 3,429,835.

The methine compounds of the present invention can be used as filter dyes, irradiation prevention dyes and antihalation dyes to improve sharpness and color separatability.

The methine compounds can be contained in coating solutions for silver halide photographic layers, filter layers and/or antihalation layers by using conventional methods. The dyes may be used in an amount sufficient to color the photographic layers. The amounts of the dyes to be used can be appropriately determined by those skilled in the art according to purpose. The dyes are generally used in such an amount as to give an optical density of preferably 0.05 to 3.0.

The dyes may be added at any stage before coating.

A polymer having an opposite charge to that of the dye ion may be allowed to coexist as a mordant in a dye-containing layer, and the dye may localized in a specific layer by an interaction between the polymer and the dye molecule.

Examples of the polymer mordant include those described in U.S. Pat. Nos. 2,548,564, 4,124,386, 3,625,694, 3,958,996, 4,168,976 and 3,445,231.

Examples of supersensitizing dyes which are useful in conducting spectral sensitization in the present invention include pyrimidylamino compounds, triazinyl compounds and azolium compounds described in U.S. Pat. Nos. 3,511,664, 3,615,613, 3,615,632, 3,615,641, 4,596,767, 4,945,038, 4,965,182 and 5,061,018 and JP-A-4-146431. The methods for using them are preferably those described in the above-described patent specifications.

Any of silver bromide, silver iodobromide, silver iodochlorobromide, silver chlorobromide and silver chloride can be used as silver halide used in the photographic materials of the present invention. However, the preferred silver halide is silver bromide, silver chlorobromide, silver iodochlorobromide or high silver chloride described in JP-A-2-42.

The structures and processing of the photographic materials is described below. The structure and processing described in JP-A-2-42 can be preferably used particularly when silver halide is high silver chloride. The structure and processing described in JP-A-63-264743 can be preferably used, particularly when silver halide is silver chlorobromide.

Silver halide grains in the photographic materials may have a regular crystal form such as a cubic form, a tetradecahedral form or a rhombic dodecahedral form, an irregular crystal form such as a spherical form or a tabular form or a composite form of these crystal forms. A mixture composed of grains having various crystal forms may be used.

The silver halide grains may be different in phase between the interior of the grain and the surface layer thereof or may be composed of a uniform phase throughout the grain. The grains may be grains where a latent image is predominantly formed on the surface of the grain (e.g., negative type photographic materials), grains where a latent image is predominantly formed in the interior of the grain (e.g., internal latent image type photographic materials), or previously fogged grains (e.g., direct positive type photographic materials).

The silver halide grains having the above-described halogen compositions, crystal habit, grain structures and grain forms can be used in various photographic materials.

The methine compounds of the present invention can be used in the photographic materials to be applied to the following fields to use them as sensitizing agents, sensitizing dyes, filter dyes, antihalation dyes and irradiation-preventing dyes. The methine dyes of the present invention can be added to any desired layers such as interlayers, protective layers and back layers in addition to the light-sensitive emulsion layers.

The methine compounds of the present invention can be used in various color and black and white photographic materials.

More specifically, the methine dyes of the present invention can be used in color positive photographic materials, color paper photographic materials, color negative photographic materials, reversal color photographic materials (with or without couplers), direct positive silver halide photographic materials, photographic materials for plate making (e.g., lith films, lith duplicating films), photographic materials for cathode ray tube display, X-ray photographic materials (particularly films for direct or indirect photographing using a screen), photographic materials for use in a silver salt diffusion transfer process, photographic materials for use in a color diffusion transfer process, photographic materials for use in an inhibition process, photographic materials for use in a silver dye bleaching process, and heat developing photographic materials.

The silver halide photographic emulsions which can be used in the present invention can be prepared by using the methods described in P. Glafkides, *Chimie et Physique Photographique* (Paul Montel 1967), G. F. Duffin, *Photographic Emulsion Chemistry* (The Focal Press 1966) and V. L. Zelikman et al., *Making and Coating Photographic Emulsion* (The Focal Press 1964).

Ammonia, potassium rhodanide, ammonia rhodanide, thioethers (e.g., those described in U.S. Pat. Nos. 3,271,157, 3,574,628, 3,704,130, 4,297,439 and 4,276,374), thione compounds (e.g., those described in JP-A-53-144319, JP-A-53-82408 and JP-A-55-77737), and amine compounds (e.g., those described in JP-A-54-100717) can be used as solvents for silver halide to control the growth of the silver halide grains during their formation.

A cadmium salt, a zinc salt, a thallium salt, an iridium salt or a complex salt thereof, a rhodium salt or a complex salt thereof, or an iron salt or a complex salt thereof may be present during the course of the formation of the silver halide grains or during the physical ripening thereof.

Examples of internal latent image type silver halide emulsions which can be used in the present invention include conversion type silver halide emulsions, core/-shell type silver halide emulsions and silver halide emulsions containing different metals therein described in U.S. Pat. Nos. 2,592,250, 3,206,313, 3,447,927, 3,761,276 and 3,935,014.

Usually, the silver halide emulsions are chemically sensitized. Chemical sensitization can be carried out, for example, by using the methods described in H. Frieser, *Die Grundlagen der Photographischen Prozesse mit Silberhalogeniden* (Akademische Verlagsgesellschaf 1968), pp. 675-734.

Namely, the sulfur sensitizing method using a sulfur-containing compound capable of reacting with active gelatin and silver (e.g., a thiosulfate, a thiourea, a mercapto compound, a rhodanine or the like); the selenium sensitization method; the reduction sensitization method using a reducing material (e.g., a stannous salt, an amine, a hydrazine derivative, formamidinesulfonic acid or a silane compound); and the noble metal sensitization method using a noble metal compound (e.g., a gold complex salt, or a complex salt of Group VIII metal such as Pt, It, Pd or the like) can be used. These methods may be used either alone or in combination.

The photographic materials used in the present invention may contain various compounds to prevent fogging from occurring during the preparation, storage or processing of the photographic materials or to stabilize the photographic performance thereof. Examples of the anti-fogging agents or the stabilizers include: thiazoles such as benzthiazolium salts described in U.S. Pat. Nos. 3,954,478 and 4,942,721 and JP-A-59-191032 and the ring opening compounds thereof described in JP-B-59-26371 (the term "JP-B" as used herein means an "examined Japanese patent publication"), nitroindazoles, triazoles, benztriazoles, benzimidazoles (particularly nitro- or halogen-substituted compounds); heterocyclic mercapto compounds such as mercapto thiazoles, mercaptobenzthiazoles, mercaptobenzimidazoles, mercaptothiadiazoles, mercaptotetrazoles (particularly 1-phenyl-5-mercaptotetrazole), mercaptopyrimidines; heterocyclic mercapto compounds. having a water-soluble group such as a carboxyl group or a sulfo group; thioketone compounds such as oxazolinethione; azaindenes such as tetrazaindenes (particularly 4-hydroxy-substituted (1,3,3a,7)tetrazaindenes); benzenethiosulfonic acids; benzenesulfonic acids; and acetylene compounds described in JP-A-62-87957.

The silver halide photographic materials of the present invention can contain color couplers such as cyan couplers, magenta couplers and yellow couplers and compounds for use in dispersing these couplers.

Namely, the silver halide photographic materials can contain compounds capable of forming colors by the oxidative coupling thereof with aromatic primary developing agents (e.g., phenylenediamine derivatives, aminophenol derivatives) in the color development stage. Examples of the magenta couplers include 5-pyrazolone couplers, pyrazolobenzimidazole couplers, cyanoacetylcoumarone couplers and ring open acylacetonitrile couplers. Examples of the yellow couplers include acylacetamide couplers (e.g., benzoyl acetanilides, pivaloylacetanilides). Examples of the cyan couplers include naphthol couplers and phenol couplers. It is preferred that these couplers have a hydrophobic group called a ballast group so that the couplers are non-diffusing. The couplers may be any of the four equivalent type or the two equivalent type to silver ion. Colored couplers having an effect of correcting colors and couplers which release a restrainer (so-called DIR couplers) during development may be used.

In addition to the DIR couplers, non-color forming DIR coupling compounds which form a colorless product by the coupling reaction and release a restrainer may be used.

The photographic materials of the present invention may contain polyalkylene oxides or ethers or esters thereof or amine derivatives thereof, thioether compounds, thiomorpholines, quaternary ammonium chloride compounds, urethane derivatives, urea derivatives, imidazole derivatives and 3-pyrazolidones to increase sensitivity or contrast or to accelerate development.

The silver halide photographic materials of the present invention may contain various dyes as filter dyes or irradiation preventing dyes in addition to the methine compounds of the present invention.

Examples of the dyes include oxonol dyes having pyrazolone nucleus or a barbituric acid nucleus described in U.K. Patents 506,385, 1,177,429, 1,311,884, 1,338,799, 1,385,371, 1,467,214, 1,433,102 and 1,553,516, JP-A-48-85130, JP-A-49-114420, JP-A-52-117123, JP-A-55-161233, JP-A-59-111640, JP-B-39-22069, JP-B-43-13168, JP-A-62-273527, and U.S. Pat. Nos. 3,247,127, 3,469,985 and 4,078,933; oxonol dyes described in U.S. Pat. Nos. 2,533,472 and 3,379,533, U.K. Patent 1,278,621, JP-A-1-134447 and JP-A-1-183652; azo dyes described in U .K. Patents 575,691, 680,631, 599,623, 786,907, 907,125 and 1,045,609, U.S. Pat. No. 4,255,326 and JP-A-59-211043; azomethine dyes described in JP-A-50-100116, JP-A-54-118247 and U.K. Patents 2,014,598 and 750,031; anthraquinone dyes described in U.S. Pat. No. 2,865,752; arylidene dyes described in U.S. Pat. Nos. 2,533,009, 2,688,541 and 2,538,008, U.K. Patents 584,609 and 1,210,252, JP-A-50-40625, JP-A-51-3623, JP-A-51-10927, JP-A-54-118247, JP-B-48-3286 and JP-B-59-37303; styryl dyes described in JP-B-28-3082, JP-B-44-16594 and JP-B-59-28898; triarylmethane dyes described in U.K. Patents 446,583 and 1,335,422 and JP-A-59-228250; merocyanine dyes described U.K. Patents 1,075,653, 1,153,341, 1,284,730, 1,475,228 and 1,542,807; and cyanine dyes described in U.S. Pat. Nos. 2,843,486 and 3,294,539 and JP-A-1-291247.

These dyes can be prevented from diffusing in the following manner.

For example, a hydrophilic polymer having an opposite charge to that of the dissociated anionic dye is allowed to be present as a mordant in a layer, and the dyes are localized in that specific layer by an interaction between the polymer and the dye compound. This method is disclosed in U.S. Pat. Nos. 2,548,564, 4,124,386 and 3,625,694.

A method for dyeing a specific layer by using a water-insoluble dye solid is disclosed in JP-A-56-12639, JP-A-55-155350, JP-A-55-155351, JP-A-63-27838, JP-A-63-197943 and European Patent 15,601.

A method for dyeing a specific layer by using fine metal salt particles containing a dye adsorbed thereon is disclosed in U.S. Pat. Nos. 2,719,088, 2,496,841 and 2,496,843 and JP-A-60-45237.

The photographic materials of the present invention may contain various surfactants as coating aids or to impart antistatic properties, to improve slipperiness and emulsifying dispersion, to prevent sticking from occurring or to improve photographic characteristics (e.g., development acceleration, high contrast, sensitization).

In the practice of the present invention, additives are used in the silver halide emulsions and hydrophilic colloid. Examples of the additives include anti-fading agents, inorganic or organic hardening agents, color fogging inhibitors, ultraviolet light absorbers, mordants, plasticizers, latex polymers and matting agents. Specific examples thereof are described in *Research Disclosure*, Vol. 176, No. 17643 (December, 1978).

Hydrophilic polymers such as gelatin are used as protective colloid in the photographic materials of the present invention.

The finished silver halide emulsions are coated on an appropriate support such as barayta paper, resin-coated paper, synthetic paper, triacetate film, polyethylene terephthalate film, other plastic bases or a glass sheet.

Exposure to light may be carried out in a conventional manner to obtain a photographic image. Any conventional light source, such as natural light (sunlight), a tungsten lamp, a fluorescent lamp, a mercury vapor lamp, a xenon arc lamp, a carbon arc lamp, a xenon a flushing lamp and a cathode ray tube flying spot can be used. The exposure time may be a time ranging from 1/1000 to 1 sec which is conventionally applied to cameras. If desired, a shorter exposure time than 1/1000 sec may be used. For example, an exposure time of $1/10^4$ to $1/10^6$ sec may be used with a xenon flush lamp or a cathode ray tube. Further, a longer exposure time than one second may be used. If desired, the spectral composition of light used for exposure may be controlled by using a color filter. Laser beams may be used to conduct exposure to light. Exposure to light may be carried out by light emitted from phosphors excited by electron beam, X-rays, gamma rays or alpha rays.

The photographic materials of the present invention may be processed by using conventional methods and processing solutions described in *Research Disclosure*, Vol. 176, pp. 28–30, No. 17643. The photographic processing may be photographic processing for forming a silver image (black and white photographic processing) and photographic processing for forming a dye image (color photographic processing). The processing temperature is usually in the range of 18° to 50° C. However, a lower temperature than 18° C. or a higher temperature than 50° C. may be used.

The present invention is now illustrated in greater detail by reference to the following examples which, however, are not to be construed as limiting the invention in any way.

In the example, the term "λmax", "ε", and "m.p." as used herein mean "absorption maximum in methanol", "absorption coefficient", and "melting point", respectively.

EXAMPLE 1 synthesis of Compound (I-2)

Compound (II-1) used as the starting material was synthesized by the following route (I) or (II).

Synthesis Route (I) of Compound (II-1):

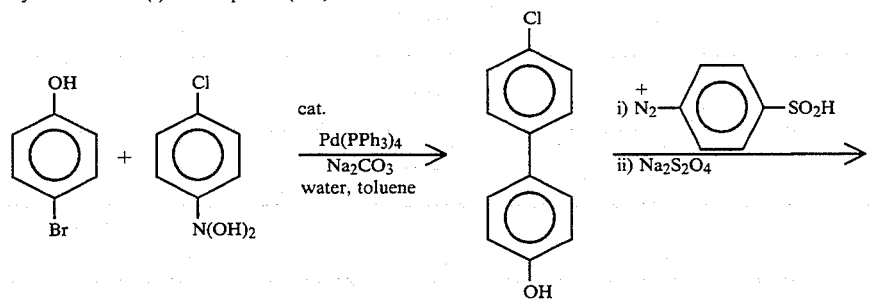

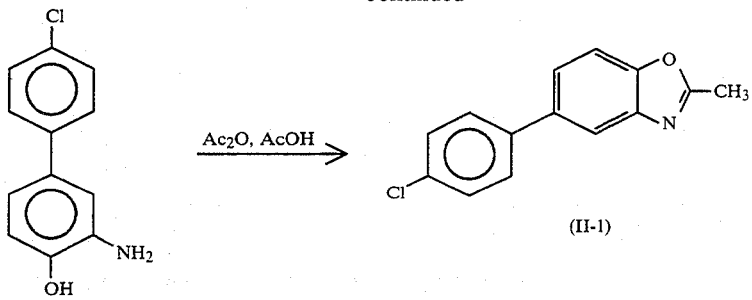

Synthesis Route (II) of Compound (II-2):

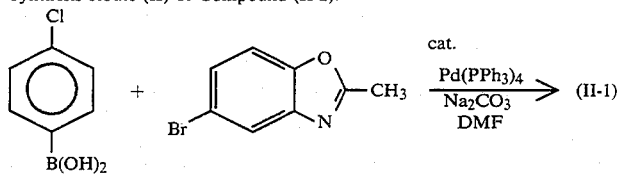

Synthesis Route of Compound (I-2):

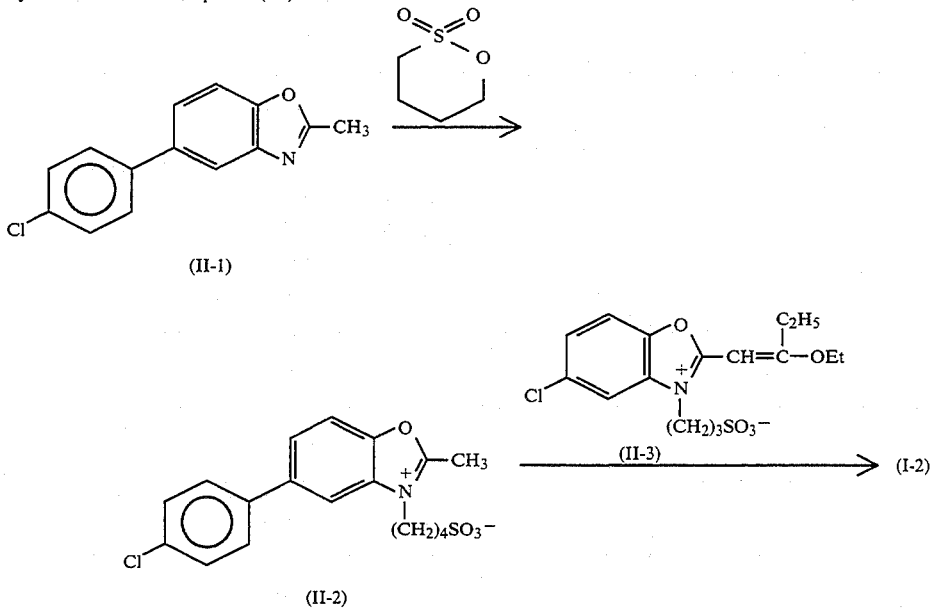

4.3 g of Compound (II-1) and 4.0 g of butane-sultone were heated in an oil bath at an external temperature of 150° C. with stirring for 6 hours. After the reaction mixture solution was cooled, 20 ml of ethyl acetate was added thereto. The precipitated crystal was recovered by filtration and dried to obtain 6.0 g of Intermediate (II-2).

Subsequently, 0.3 g of Intermediate (II-2), 0.35 g of Intermediate (II-3) and 2 ml of N,N-dimethylacetamide were heated in an oil bath at an external temperature of 150° C. with stirring for 2 hours. After the reaction mixture was cooled, 20 ml of ethyl acetate was added thereto, and the precipitated crystal was recovered by filtration. The resulting crude crystal was dissolved in a solution of 0.1 g of sodium acetate, 5 ml of methanol and 5 ml of isopropanol, and the solvents were distilled off under atmospheric pressure. After the reaction mixture was cooled, the precipitated crystal was recovered by filtration and dried to obtained 0.1 g of the desired Compound (I-2).

$\lambda_{max} = 500$ nm (MeOH)

$\epsilon = 1.30 \times 10^5$ m.p. = 245° C. (dec.)

EXAMPLE 2

Synthesis of Compound (I-12)

Synthesis Route:

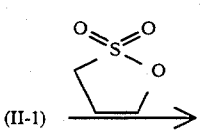

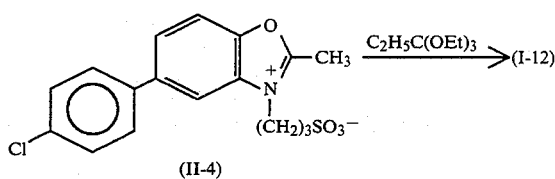

2.0 g of Compound (II-1), 1.0 g of propanesultone and 2 ml of anisole were heated in an oil bath at an external temperature of 155° C. with heating for 4 hours. After

EXAMPLE 4

Synthesis of Compound (I-54)

Synthesis Route:

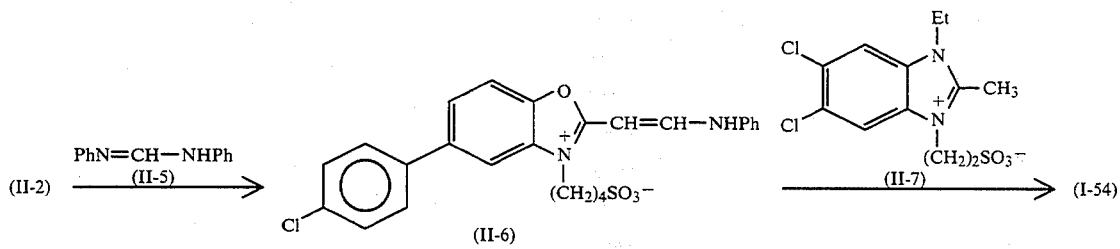

the reaction mixture solution was cooled, 20 ml of ethyl acetate was added thereto. The precipitated crystal was recovered by filtration and dried to obtain 1.5 g of Intermediate (II-5) (m.p.=240° C. with dec.).

Subsequently, 1.3 g of Intermediate (II-5), 2.5 ml of triethyl orthopropionate, 3.5 ml of pyridine, 2.5 ml of acetic acid and 1.2 ml of triethylamine were heated in an oil bath at an external temperature of 140° C. with stirring for one hour. The solvents were distilled off under atmospheric pressure. After the reaction mixture was cooled, decantation was conducted twice with diethyl ether, and ethyl acetate was added. The precipitated crystal was recovered by filtration and recrystallized from a mixed solution of methanol and isopropanol to obtain 0.6 g of the desired Compound (I-12).

$\lambda_{max}$=503.8 nm (MeOH)
$\epsilon$=1.53×10$^5$
m.p.=202° C.

EXAMPLE 3

Synthesis of Compound (I-13)

Synthesis Route:

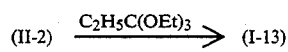

(II-2) $\xrightarrow{C_2H_5C(OEt)_3}$ (I-13)

The desired Compound (I-13) of 2.7 g prepared from 5.0 g of Compound (II-2) in the same manner as in Example 2.

$\lambda_{max}$=504 nm (MeOH)
$\epsilon$=1.53×10$^5$
m.p.=192° to 195° C. (dec.)

1.0 g of Compound (II-2), 0.8 g of Compound (II-5) and 3 ml of ethanol were heated in an oil bath with stirring for 2 hours. After the reaction mixture was cooled, 5 ml of isopropanol was added thereto. The precipitated crystal was recovered by filtration and dried to obtain 0.46 g of Intermediate (II-6).

Subsequently, 0.4 g of Intermediate (II-6), 0.28 g of Compound (II-7), 0.2 ml of acetic anhydride, 0.4 ml of triethylamine and 3 ml of dimethylformamide were heated in an oil bath at an external temperature of 120° C. for 30 minutes. After the reaction mixture solution was cooled, a mixture of ethyl acetate and acetonitrile was added thereto. The precipitated crystal was recovered by filtration and recrystallized from a mixed solution of methanol and isopropanol to obtain 0.18 g of the desired Compound (I-54).

$\lambda_{max}$=492 nm (MeOH)
$\epsilon$=1.01×10$^5$
m.p.=200° to 204° C.

EXAMPLE 5

Synthesis of Compound (I-53).

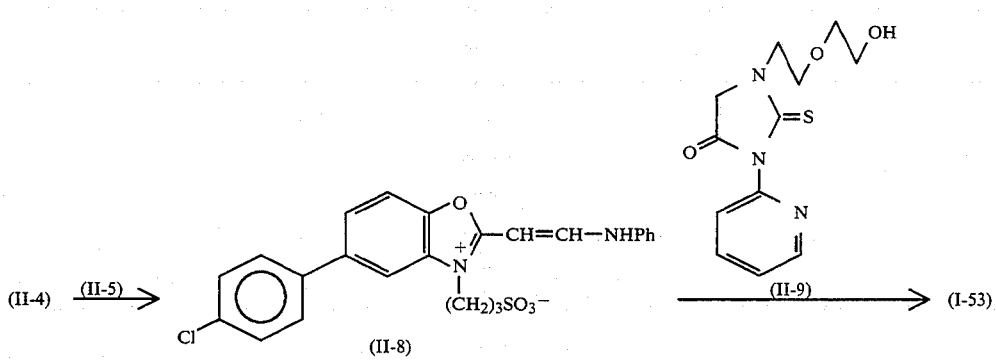

1.0 g of Compound (II-4), 0.6 g of Compound (II-5), 1.5 ml of acetic anhydride and 1.5 ml of acetonitrile were heated in a stream bath with stirring for 30 minutes. After the reaction mixture was cooled, 1.5 ml of acetonitrile was added thereto. The precipitated crystal was recovered by filtration and dried to obtain 1.4 g of Intermediate (II-8).

Subsequently, 1.4 g of Intermediate (II-8), 0.84 g of Compound (II-9) and 12 ml of morpholine were heated in an oil bath at an external temperature of 60° C. with stirring for 40 minutes. After the reaction mixture was cooled, isopropanol was added thereto. The precipi-

27 tated crystal was recovered by filtration and recrystallized from a mixed solution of methanol and ethanol to obtain 0.6 g of the desired Compound (I-53).

$\lambda_{max} = 409.5$ nm (MeOH)
$\epsilon = 1.01 \times 10^5$
m.p. $= 225°$ C.

EXAMPLE 6

Synthesis of Compound (I-23)

Compound (II-10) used as the starting material was synthesized by the following route.

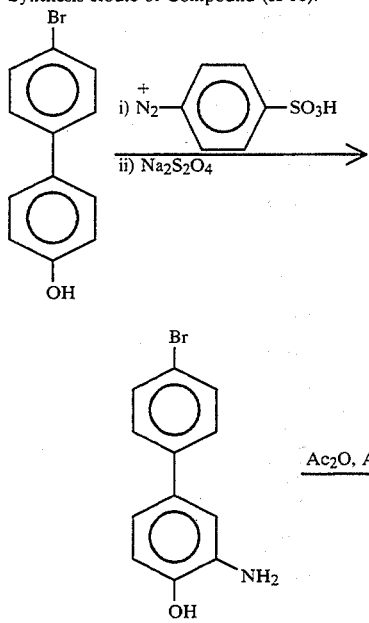

Compound (II-11) was synthesized from Compound (II-10) in the same manner as in Example 1, and the desired Compound (I-23) was prepared therefrom in the same manner as in Example 3.

$\lambda_{max} = 503.9$ nm (MeOH)
$\epsilon = 1.53 \times 10^5$
m.p. $= 264°$ to $270°$ C. (dec.)

28

EXAMPLE 7

Synthesis of Compound (I-30)

Compound (II-12) used as the starting material was synthesized by the following route.

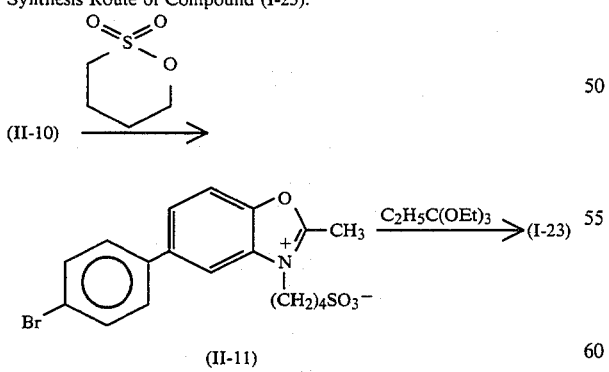

Compound (II-13) was synthesized from Compound (II-12) in the same manner as in Example 1, and the desired Compound (I-30) was prepared therefrom in the same manner as in Example 3.

$\lambda_{max} = 502.4$ nm (MeOH)
$\epsilon = 1.49 \times 10^5$
m.p. $= 180°$ C. (dec.)

EXAMPLE 8

Synthesis of Compound (I-11)

Synthesis Route:

Compound (II-14) was synthesized from Compound (II-1) and pyridine bromoethanesulfonate, and the desired Compound (I-11) was prepared therefrom in the same manner as in Example 3.

$\lambda_{max} = 504$ nm (MeOH)
$\epsilon = 1.42 \times 10^5$

EXAMPLE 9

Preparation of Emulsion 32 g of lime-processed gelatin was dissolved in 800 ml of distilled water at 40° C. Subsequently, 5.8 g of sodium chloride and 1.9 ml of N,N'-dimethylimidazolidine-2-thione (1% aqueous solution) were added thereto. The temperature of the mixture was raised to 44° C. To the resulting solution were then added a solution of 80 g of silver nitrate in 480 ml of distilled water and a solution of 27.6 g of sodium chloride in 480 ml of distilled water over a period of 60 minutes while keeping the temperature at 72° C. Further, a solution of 80 g of silver nitrate in 300 ml of distilled water and a solution of 24.3 g of sodium chloride in 300 ml of distilled water were added thereto over a period of 20 minutes while keeping the temperature at 44° C. After the resulting emulsion was desalted and washed with water at 40° C., 90 g of lime-processed gelatin was added thereto. The pAg of the emulsion was adjusted to 7.4, and the pH thereof was adjusted to 6.4 by using sodium chloride and sodium hydroxide. Further, 4 mg of hexacyanoferrate (II) trihydrate was added during the formation of grains. After the temperature of the emulsion was raised to 52° C., fine silver bromide grains were added to the emulsion in such an amount that an increase of 0.6 mol % in the silver bromide content was obtained, thereby forming silver bromide localized phases on the surfaces of the emulsion grains. Subsequently, $1.2 \times 10^{-5}$ mol of triethylthiourea per mol of silver halide was added to the emulsion, and sulfur sensitization was carried out best. Further, the following green-sensitive sensitizing dyes were added to the emulsion to carry out spectral sensitization. The thus obtained silver chlorobromide emulsion having a silver chloride content of 99.4 mol % was referred to as B1.

In the same manner as in the preparation of the emulsion B1, an emulsion (B2) having a desired grain size was prepared by changing the reaction temperature.

Further, emulsions A1 and A2 and emulsions C1 and C2 were prepared by using blue-sensitive sensitizing dyes and red-sensitive sensitizing dye in place of the green-sensitive sensitizing dyes, respectively, each emulsion having a silver chloride content of 99.4 mol %.

Both sides of a paper support were laminated with polyethylene. The polyethylene-laminated paper support was subjected to a corona discharge treatment. A gelatin undercoating layer containing sodium dodecylbenzenesulfonate was provided thereon. Further, various photographic layers were coated thereon to prepare a multi-layer color photographic paper (101) having the following layer structure. Coating solutions were prepared in the following manner.

Preparation of Coating Solution for Third Layer 23.0 g of magenta coupler (ExM) was dissolved in 50.0 ml of ethyl acetate and 40.0 g of solvent (Solv-2). To the resulting solution was added 500 ml of a 20% aqueous solution of gelatin containing 8 ml of sodium dodecylbenzenesulfonate. The mixture was emulsified and dispersed in an ultrasonic homogenizer to prepare an emulsified dispersion. Separately, a silver chlorobromide emulsion (cubic; a 1:3 by Ag mol mixture of a larger-size grain emulsion (B1) having a mean grain size of 0.49 μm and a smaller-size emulsion (B2) having a mean grain size of 0.40 μm; a coefficient of variation in a grain size distribution: 0.10 and 0.08, respectively; 0.6 mol % of AgBr being localized on a part of the surface of the grain in each emulsion) was prepared. To the emulsion were added the following green-sensitive sensitizing dyes C ($4.2 \times 10^{-4}$ mol being added to the larger-size emulsion, and $5.3 \times 10^{-4}$ mol being added to the smaller-size emulsion, each amount being per mol of silver).

The above emulsified dispersion and the green-sensitive silver chlorobromide emulsion were mixed and dissolved, and the coating solution for the third layer was prepared so as to provide the following composition.

Coating solutions for the first through seventh layers were prepared in the same manner as in the preparation of the coating solution for the third layer. Sodium salt of 1-oxy-3,5-dichloro-s-triazine was used as the hardening agent for gelatin in each layer.

Further, (Cpd-14) and (Cpd-15) were added to each layer in such an amount as to provide 25.0 mg/m² in total and 50.0 mg/m² in total, respectively.

The following spectral sensitizing dyes were used for the silver chlorobromide emulsion contained in each light-sensitive emulsion layer.

Blue-Sensitive Emulsion Layer

Sensitizing Dye

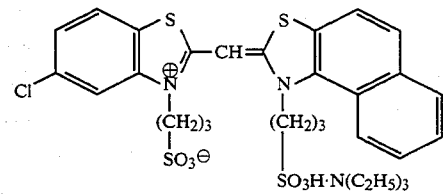

and

Sensitizing Dye

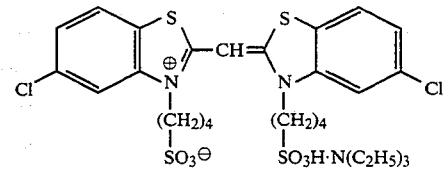

($2.0 \times 10^{-4}$ mol of each dye being added to the larger-size emulsion, and $2.5 \times 10^{-4}$ mol of each day being added to the smaller-size emulsion, each amount being per mol of silver halide).

Green-Sensitive Emulsion Layer

Sensitizing Dye (C-α): Compound (III-2)

(C-β):

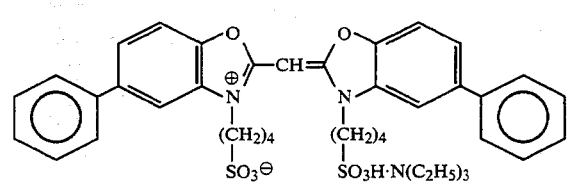

A 85:15 by weight mixture of (C-α) and (C-β) ($4.2 \times 10^{-4}$ mol being added to the larger-size emulsion, and $5.3 \times 10^{-4}$ mol being added to the smaller-size emulsion, each amount being per mol of silver halide).

Red-Sensitive Emulsion Layer

Sensitizing dye E

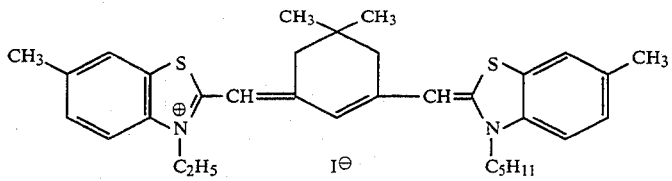

($0.9 \times 10^{-4}$ mol being added to the larger-size emulsion, and $1.1 \times 10^{-4}$ mol being added to the smaller-size emulsion, each amount being per mol of silver halide).

Further, $2.6 \times 10^{-3}$ mol of the following compound per mol of silver halide was added.

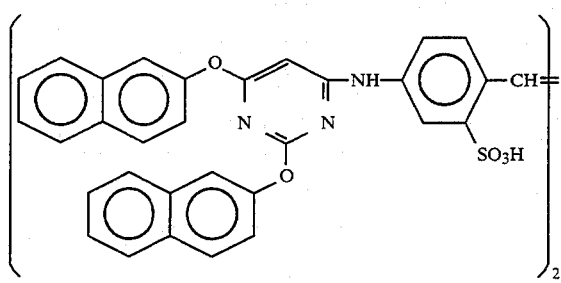

Furthermore, $8.5 \times 10^{-5}$ mol, $7.7 \times 10^{-4}$ mol and $2.5 \times 10^{-4}$ mol of 1-(5-methylureidophenyl)-5-mercaptotetrazole were added to the blue-sensitive emulsion layer, the green-sensitive emulsion layer and the red-sensitive emulsion layer respectively, each amount being per mol of silver halide.

In addition, $1 \times 10^{-4}$ mol and $2 \times 10^{-4}$ mol of 4-hydroxy-6-methyl-1,3,3a,7-tetrazaindene were added to the blue-sensitive emulsion layer and the green-sensitive emulsion layer, respectively, each amount being per mol of silver halide.

The following dyes (parenthesized numerals being coating weights) were added to the emulsion layers to prevent irradiation.

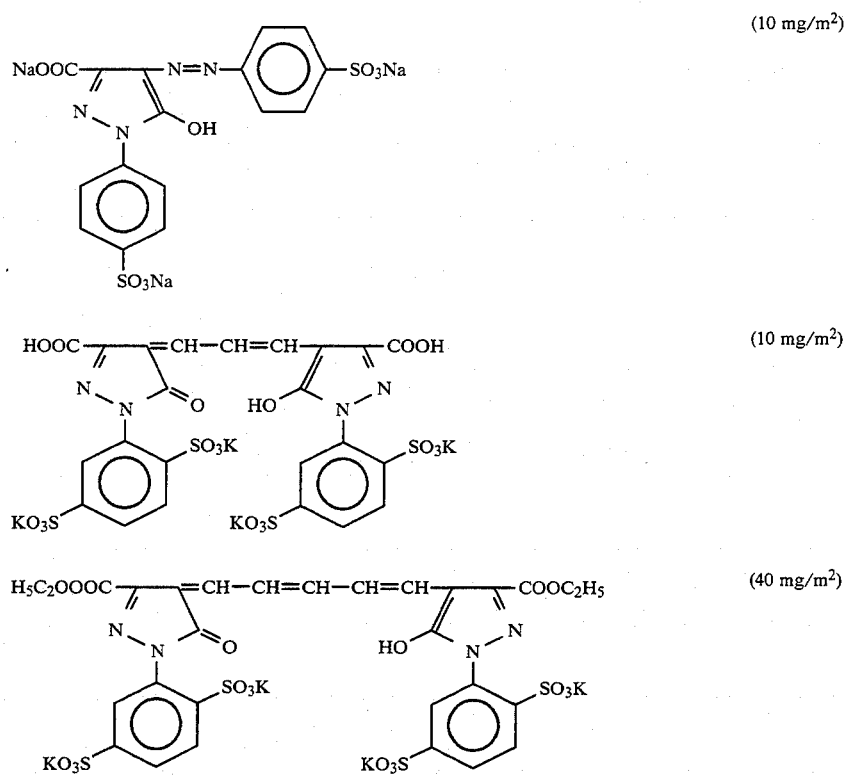

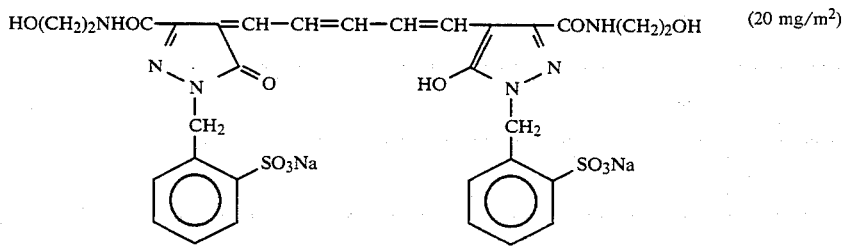 (20 mg/m²)

Layer Structure

Each layer had the following composition, Numerals represent coating weights (g/m²). The amounts of the silver halide emulsions are represented by coating weights in terms of silver.

Support
  Polyethylene-laminated paper
  [Polyethylene on the first layer side contained a white pigment (TiO₂) and bluish dye (ultramarine)]

| First Layer (blue-sensitive emulsion layer) | |
|---|---|
| Silver Chlorobromide Emulsion | 0.27 |
| (cubic; a 3:7 (by Ag mol) mixture of a larger-size emulsion A1 having a mean grain size of 0.88 μm and a smaller-size emulsion A2 having a mean grain size of 0.70 μm; a coefficient of variation in a grain size distribution being 0.08 and 0.10, respectively; 0.3 mol % of silver bromide being localized on a part of the surface of the silver chloride grain substrate in each size emulsion) | |
| Gelatin | 1.36 |
| Yellow Coupler (ExY) | 0.79 |
| Dye Image Stabilizer (Cpd-1) | 0.08 |
| Dye Image Stabilizer (Cpd-2) | 0.04 |
| Dye Image Stabilizer (Cpd-3) | 0.08 |
| Solvent (Solv-1) | 0.13 |
| Solvent (Solv-2) | 0.13 |
| Second Layer (color mixing inhibiting layer) | |
| Gelatin | 1.00 |
| Color Mixing Inhibitor (Cpd-4) | 0.06 |
| Solvent (Solv-2) | 0.25 |
| Solvent (Solv-3) | 0.25 |
| Solvent (Solv-7) | 0.03 |
| Third Layer (green-sensitive emulsion layer) | |
| Silver Chlorobromide Emulsion | 0.13 |
| (cubic; a 1:3 (by Ag mol) mixture of a larger-size emulsion B1 having a mean grain size of 0.49 μm and a smaller-size emulsion B2 having a mean grain size of 0.40 μm; a coefficient of variation in a grain size distribution being 0.10 and 0.08, respectively; 0.6 mol % of AgBr being localized on a part of the surface of the silver chloride grain substrate in each size emulsion) | |
| Gelatin | 1.45 |
| Magenta Coupler (ExM) | 0.16 |
| Dye Image Stabilizer (Cpd-2) | 0.03 |
| Dye Image Stabilizer (Cpd-5) | 0.15 |
| Dye Image Stabilizer (Cpd-6) | 0.01 |
| Dye Image Stabilizer (Cpd-7) | 0.01 |
| Dye Image Stabilizer (Cpd-8) | 0.08 |
| Solvent (Solv-3) | 0.50 |
| Solvent (Solv-4) | 0.15 |
| Solvent (Solv-5) | 0.15 |
| Fourth Layer (color mixing inhibiting layer) | |
| Gelatin | 0.70 |
| Color Mixing Inhibitor (Cpd-4) | 0.04 |
| Solvent (Solv-2) | 0.18 |
| Solvent (Solv-3) | 0.18 |
| Solvent (Solv-7) | 0.02 |
| Fifth Layer (red-sensitive emulsion layer) | |
| Silver Chlorobromide Emulsion | 0.20 |
| (cubic; a 1:4 (by Ag mol) mixture of a larger-size emulsion C1 having a mean grain size of 0.50 μm and a smaller-size emulsion C2 having a mean grain size of 0.41 μm; a coefficient of variation in a grain size distribution being 0.09 and 0.11, respectively; 0.8 mol % of AgBr being localized on a part of the surface of the silver chloride grain substrate in each size emulsion) | |
| Gelatin | 0.85 |
| Cyan Coupler (ExC) | 0.33 |
| Ultraviolet Light Absorber (UV-2) | 0.18 |
| Dye Image Stabilizer (Cpd-1) | 0.33 |
| Dye Image Stabilizer (Cpd-6) | 0.01 |
| Dye Image Stabilizer (Cpd-8) | 0.01 |
| Dye Image Stabilizer (Cpd-9) | 0.01 |
| Dye Image Stabilizer (Cpd-10) | 0.01 |
| Dye Image Stabilizer (Cpd-11) | 0.01 |
| Solvent (Solv-1) | 0.01 |
| Solvent (Solv-6) | 0.22 |
| Sixth Layer (ultraviolet light absorbing layer) | |
| Gelatin | 0.55 |
| Ultraviolet Light Absorber (UV-1) | 0.38 |
| Dye Image Stabilizer (Cpd-5) | 0.02 |
| Dye Image Stabilizer (Cpd-12) | 0.15 |
| Seventh Layer (protective layer) | |
| Gelatin | 1.13 |
| Acrylic-modified Copolymer of Polyvinyl Alcohol (a degree of modification: 17%) | 0.05 |
| Liquid Paraffin | 0.02 |
| Surfactant (Cpd-13) | 0.01 |

(ExY) Yellow Coupler

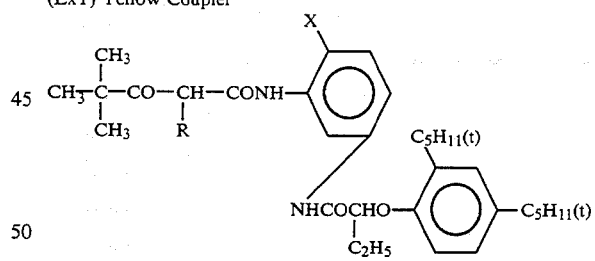

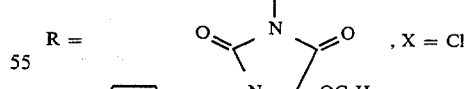, X = Cl and

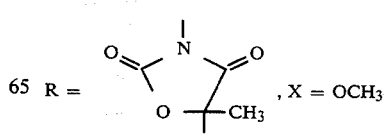, X = OCH₃

A 1:1 by mol mixture (ExM) Magenta Coupler

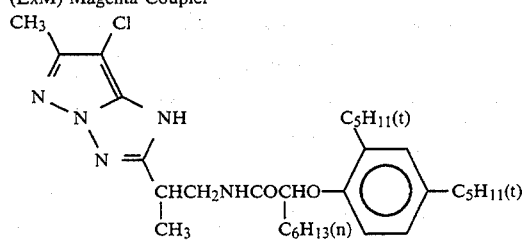

(ExC) Cyan Coupler

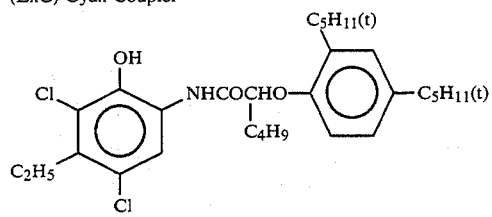

and

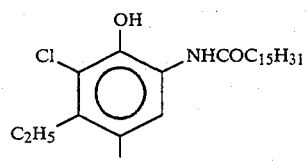

A 3:7 by mol mixture (Cpd-1) Dye Image Stabilizer

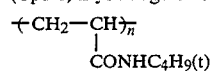

average mol. wt.: 60,000

(Cpd-2) Dye Image Stabilizer

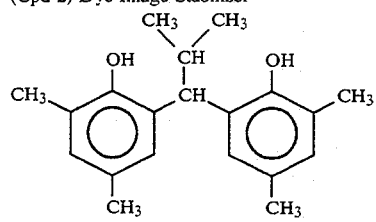

(Cpd-3) Dye Image Stabilizer

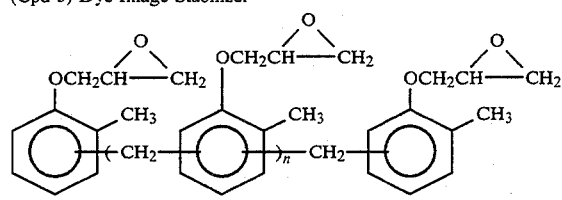

n = 7~8 (mean value)

(Cpd-4) Color Mixing Inhibitor

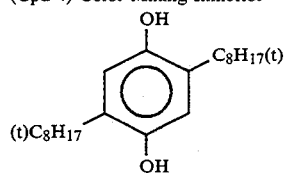

(Cpd-5) Dye Image Stabilizer

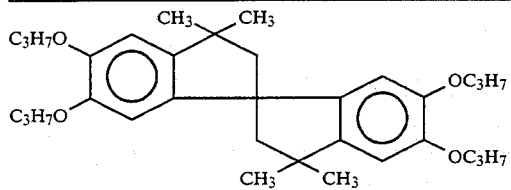

(Cpd-6) Dye Image Stabilizer

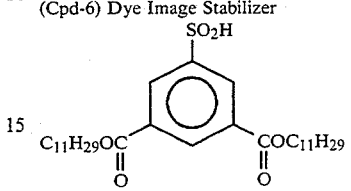

(Cpd-7) Dye Image Stabilizer

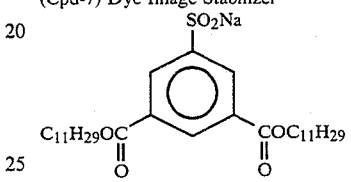

(Cpd-8) Dye Image Stabilizer

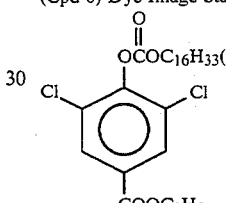

(Cpd-9) Dye Image Stabilizer

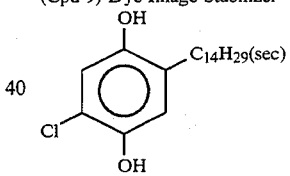

(Cpd-10) Dye Image Stabilizer

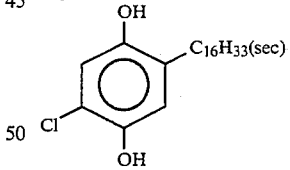

(Cpd-11) Dye Image Stabilizer

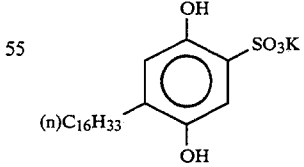

(Cpd-12) Dye Image Stabilizer

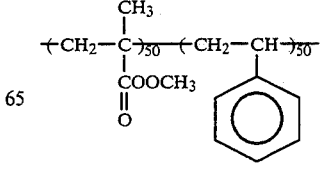

Average Mol. Wt. 60,000

(Cpd-13) Surfactant
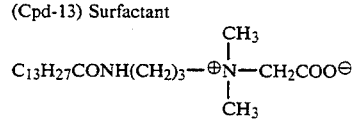

(Cpd-14) Antiseptic
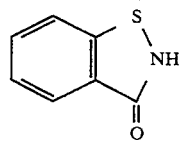

(Cpd-15) Antiseptic
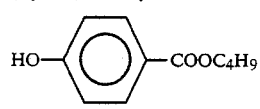

(UV-1) Ultraviolet Light Absorber
(i)
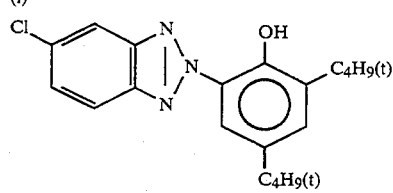

(ii)
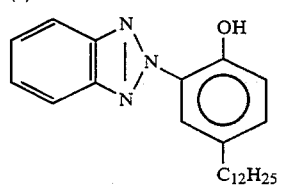

(iii)
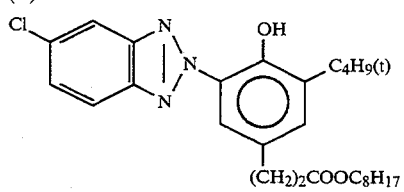

(iv)
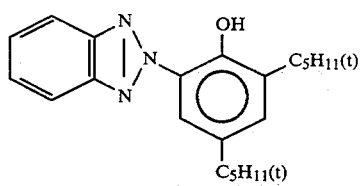

A 1:5:10:5 mixture (by weight) of (i), (ii), (iii) and (iv)

(UV-2) Ultraviolet Light Absorber
(v)
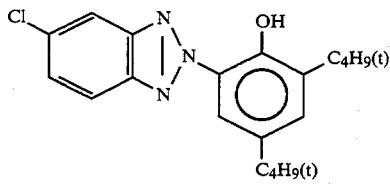

(vi)

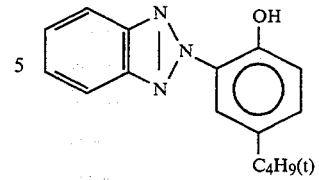

(vii)
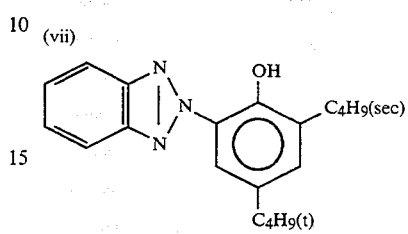

A 1:2:2 mixture (by weight) of (v), (vi), and (vii)

(Solv-1) Solvent
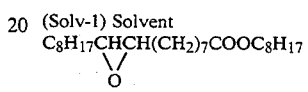

(Solv-2) Solvent
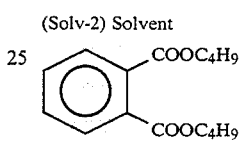

(Solv-3) Solvent
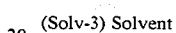
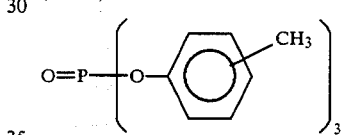

(Solv-4) Solvent
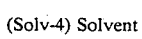
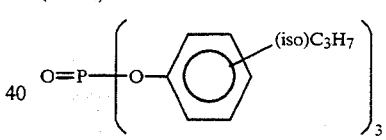

(Solv-5) Solvent
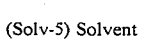
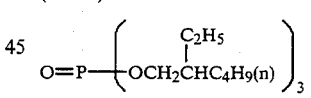

(Solv-6) Solvent
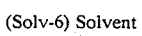
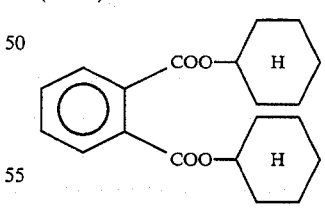

(Solv-7) Solvent
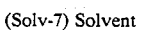
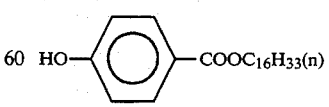

The thus obtained light-sensitive material (Sample No. 101) was referred to as a reference sample. Sample Nos. 102 to 112 were prepared in the same manner as in the preparation of Sample No. 101 except that spectral sensitizing dyes shown in Table 1 below were used as dyes for spectral sensitizing the wavelength region of green light.

Each of the dyes was added in the same amount in total as that used in Sample No. 101. When two kinds of the dyes were used, the dyes in a ratio of 1:1 were added to each of the smaller-size emulsion and the larger-size emulsion. When three kinds of the dyes were used, the dyes were used in a ratio of 1:1:1.

A change in sensitivity of the thus obtained 12 kinds of the light-sensitive materials with the passage of time after the preparation of the coating solution was examined in the following manner. There were prepared the samples coated after the coating solution for the third layer was prepared and then left to stand at 40° C. for 20 minutes and the samples coated after the coating solution for the third layer was prepared and then left to stand at 40° C. for 6 hours. These samples were exposed to light (exposure amount: 250 CMS; exposure time: one sec) through an optical wedge equipped with a green filter, and processed with the following processing solutions in the following stages.

The reflection density of the processed samples was measured to obtain a characteristic curve. The reciprocal of the exposure amount providing a density higher by 0.5 than fog density is referred to as the sensitivity.

A change in sensitivity is valuated in the following criterion. Namely, a change in sensitivity with the passage of time after the preparation of the coating solution is evaluated by $\Delta S(S_A - S_B)$ wherein $S_A$ is the sensitivity of the sample coated after the coating solution for the third layer is prepared and then left to stand at 40° C. for 20 minutes, and $S_B$ is the sensitivity of the sample coated after the coating solution for the third layer is prepared and then left to stand at 40° C. for 6 hours (the closer $\Delta S$ to a value of zero, the stability of the coating solution with the passage of time is better). Development treatment:

The exposed samples were subjected to continuous processing (running test) in the following stages by using a paper processor until the replenishment rate of the color developing solution reached twice the capacity of the tank.

| Processing Stage | Temp. (°C.) | Time (sec) | Replenisher* (ml) | Tank Capacity (liter) |
|---|---|---|---|---|
| Color Development | 35 | 45 | 161 | 17 |
| Bleach-Fixing | 30–35 | 45 | 215 | 17 |
| Rinse I | 30–35 | 20 | — | 10 |
| Rinse J | 30–35 | 20 | — | 10 |
| Rinse K | 30–35 | 20 | 350 | 10 |
| Drying | 70–80 | 60 | | |

*Replenishment rate being per m² of the light-sensitive material.
(Three tank countercurrent system of from rinse K to rinse I was used.)

Each processing solution had the following composition.

| | Tank Solution | Replenisher |
|---|---|---|
| Color Developing Solution | | |
| Water | 800 ml | 800 ml |
| Ethylenediamine-N,N,N',N'-tetramethylenephosphonic Acid | 1.5 g | 2.0 g |
| Potassium Bromide | 0.015 g | — |
| Triethanolamine | 8.0 g | 12.0 g |
| Sodium Chloride | 1.4 g | — |
| Potassium Carbonate | 25 g | 25 g |
| N-Ethyl-N-(α-methane-sulfonamidoethyl)-3-methyl-4-aminoaniline Sulfate | 5.0 g | 7.0 g |
| N,N-Bis(carboxymethyl)-hydrazine | 4.0 g | 5.0 g |
| N,N-Di(sulfoethyl)hydroxyl-amine 1Na | 4.0 g | 5.0 g |
| Fluorescent Brightener (WHITEX 4B, a product of Sumitomo Chemical Co., Ltd.) | 1.0 g | 2.0 g |
| Add water to make | 1,000 ml | 1,000 ml |
| pH (25° C.) | 10.05 | 10.45 |
| Bleach-Fixing Solution | | |
| Tank solution and replenisher being the same. | | |
| Water | 400 ml | |
| Ammonium Thiosulfate (700 g/liter) | 100 ml | |
| Sodium Sulfite | 17 g | |
| Ammonium Ethylenediaminetetraacetato Ferrate | 55 g | |
| Disodium Ethylenediaminetetraacetate | 5 g | |
| Ammonium Bromide | 40 g | |
| Add Water to make | 1,000 ml | |
| pH (25° C.) | 6.0 | |

Rinsing Solution

Tank solution and replenisher being the same. Ion-exchanged Water (the concentration of each of calcium ion and magnesium ion being reduced to 3 ppm or lower).

TABLE 1

| Sample No. | Spectral Sensitizing Dye in the Wavelength Region of Green Light | ΔS | Remarks |
|---|---|---|---|
| 101 | (C-α) + (C-β) | 0.09 | Comparison |
| 102 | (C-γ) | 0.08 | " |
| 103 | Conventional Dye A | 0.09 | " |
| 104 | Conventional Dye B | 0.12 | " |
| 105 | (I-22) | 0.04 | Invention |
| 106 | (I-30) | 0.03 | " |
| 107 | (I-13) | 0.02 | " |
| 108 | (I-23) | 0.02 | " |
| 109 | (I-30) + (C-α) | 0.01 | " |
| 110 | (I-23) + (C-α) | 0.01 | " |
| 111 | (I-13) + (C-α) | 0.00 | " |
| 112 | (I-13) + (I-23) + (C-α) | 0.01 | " |

Sensitizing Dye (C-γ)

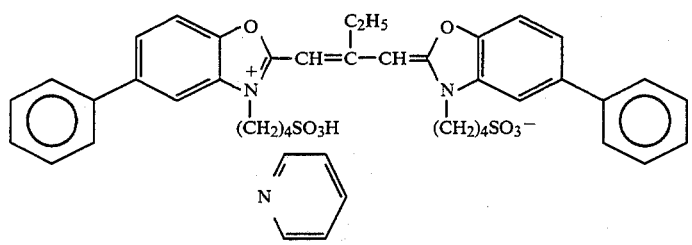

It is apparent from the results shown in Table 1 that an improved effect can be obtained by the present invention. Namely, Sample Nos. 101 to 104 containing the sensitizing dyes which are outside the scope of the present invention are greatly desensitized with the passage of time. On the other hand, in Sample Nos. 105 to 108 are containing the sensitizing dyes of the present invention, the degree of desensitization with the passage of time can be reduced. Further, in Sample Nos. 109 to 112 containing a blend of Sensitizing Dye (C-α) with the sensitizing dye of the present invention, the degree of desensitization with the passage of time can be further reduced.

EXAMPLE 10

Sample Nos. 201 to 212 shown in Table 2 below were prepared in the same manner as in Example 9 except that the following layer structure was used in place of that used in Example 9.

Support

Polyethylene-laminated Paper (central surface average roughness $SR_A = 0.12$ μm)

[Polyethylene on the first layer side contained a white pigment (14 wt % $TiO_2$) and bluish dye (ultramarine)]

| | |
|---|---|
| First Layer (blue-sensitive emulsion layer) | |
| Silver Chlorobromide Emulsion (The same emulsion as that used in the first layer of Example 9) | 0.30 |
| Gelatin | 1.22 |
| Yellow Coupler (ExY-2) | 0.55 |
| Dye Image Stabilizer (Cpd-16) | 0.19 |
| Solvent (Solv-9) | 0.18 |
| Solvent (Solv-1) | 0.18 |
| Dye Image Stabilizer (Cpd-1) | 0.06 |
| Second Layer (color mixing inhibiting layer) | |
| Gelatin | 0.64 |
| Color Mixing Inhibitor (Cpd-4) | 0.10 |
| Solvent (Solv-2) | 0.16 |
| Solvent (Solv-3) | 0.08 |
| Third Layer (green-sensitive emulsion layer) | |
| Silver Chlorobromide Emulsion (the same emulsion as that used in the third layer of Example 9) | 0.14 |
| Gelatin | 1.28 |
| Magenta Coupler (ExM) | 0.23 |
| Dye Image Stabilizer (Cpd-8) | 0.03 |
| Dye Image Stabilizer (Cpd-5) | 0.16 |
| Dye Image Stabilizer (Cpd-17) | 0.02 |
| Dye Image Stabilizer (Cpd-2) | 0.02 |
| Solvent (Solv-8) | 0.40 |
| Fourth Layer (ultraviolet light absorbing layer) | |
| Gelatin | 1.41 |
| Ultraviolet Light Absorber (UV-3) | 0.47 |
| Color Mixing Inhibitor (Cpd-4) | 0.05 |
| Solvent (Solv-10) | 0.24 |
| Fifth Layer (red-sensitive emulsion layer) | |
| Silver Chlorobromide Emulsion (the same emulsion as that used in the fifth layer of Example 9) | 0.20 |
| Gelatin | 1.04 |
| Cyan Coupler (ExC-2) | 0.31 |
| Dye Image Stabilizer (Cpd-8) | 0.03 |
| Dye Image Stabilizer (Cpd-17) | 0.02 |
| Dye Image Stabilizer (Cpd-18) | 0.18 |
| Dye Image Stabilizer (Cpd-1) | 0.40 |
| Dye Image Stabilizer (Cpd-19) | 0.05 |
| Solvent (Solv-11) | 0.14 |
| Sixth Layer (ultraviolet light absorbing layer) | |
| Gelatin | 0.48 |
| Ultraviolet Light Absorber (UV-3) | 0.16 |
| Color Mixing Inhibitor (Cpd-4) | 0.02 |
| Solvent (Solv-10) | 0.08 |
| Seventh Layer (protective layer) | |
| Gelatin | 1.10 |
| Acrylic-Modified Copolymer of Polyvinyl Alcohol (a degree of modification: 17%) | 0.17 |
| Liquid Paraffin | 0.03 |

(ExY-2) Yellow Coupler

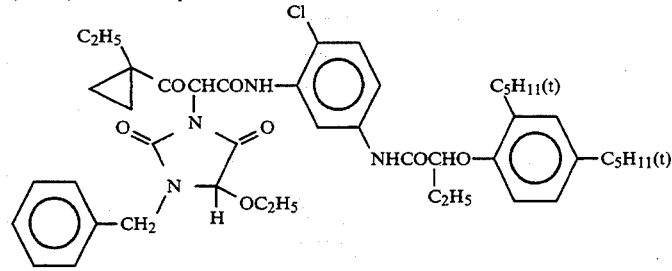

and
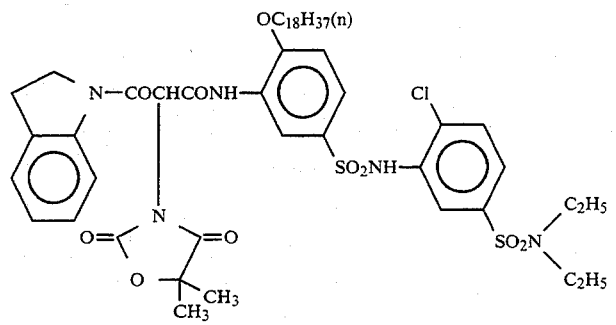
A 1:1 mixture by mole
(ExC) Cyan Coupler
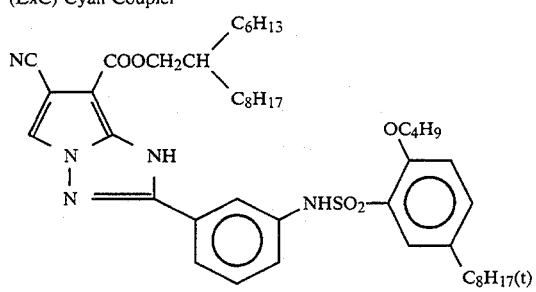
(Cpd-16) Dye Image Stabilizer
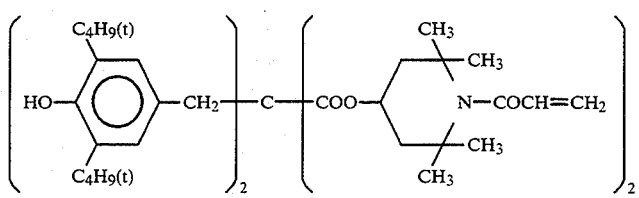
(Cpd-17) Dye Image Stabilizer
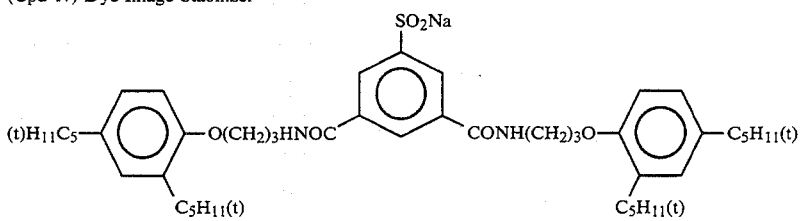
(Cpd-18) Dye Image Stabilizer
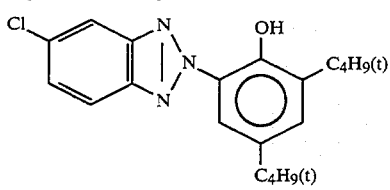
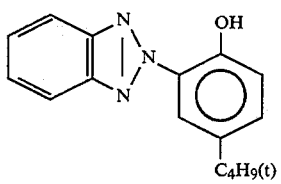

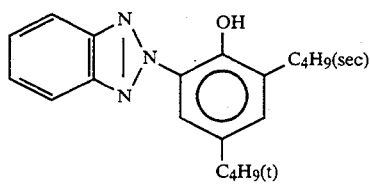
A 2:4:4 mixture (by weight)
(Cpd-19) Dye Image Stabilizer
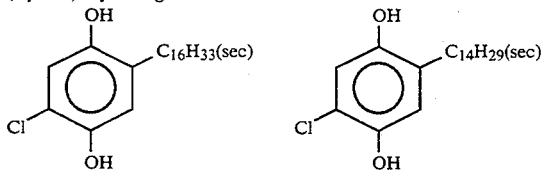
A 1:1 mixture (by weight)
(UV-3) Ultraviolet Light Absorber
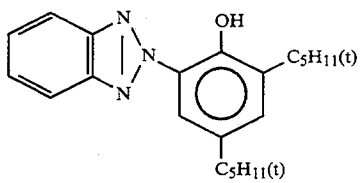
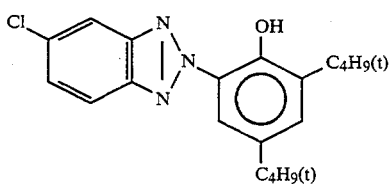
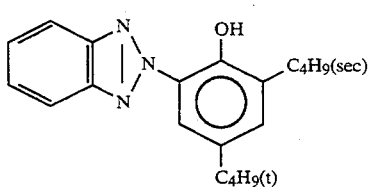
A 4:2:4 mixture (by weight)
(Solv-8) Solvent
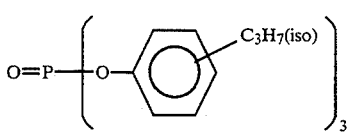
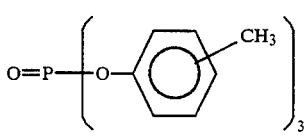
A 1:1 mixture (by volume)
(Solv-9) Solvent
O=P(OC$_9$H$_{19}$(iso))$_3$
(Solv-10) Solvent
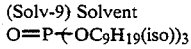
(Solv-11) Solvent

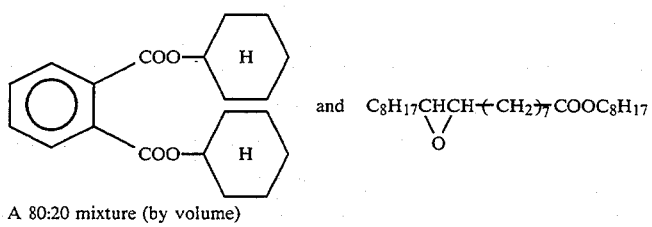

and  $C_8H_{17}CHCH(CH_2)_7COOC_8H_{17}$
         \ /
          O

A 80:20 mixture (by volume)

TABLE 2

| Sample No. | Spectral Sensitizing Dye in the Wavelength Region of Green Light | ΔS | Remarks |
| --- | --- | --- | --- |
| 201 | (C-α) + (C-β) | 0.08 | Comparison |
| 202 | (C-γ) | 0.08 | " |
| 203 | Conventional Dye A | 0.09 | " |
| 204 | (I-22) | 0.04 | Invention |
| 205 | (I-30) | 0.03 | " |
| 206 | (I-23) | 0.02 | " |
| 207 | (I-13) | 0.02 | " |
| 208 | (I-12) | 0.04 | " |
| 209 | (I-23) + (C-α) | 0.01 | " |
| 210 | (I-13) + (C-α) | 0.00 | " |
| 211 | (I-30) + (C-α) | 0.00 | " |
| 212 | (I-13) + (I-30) + (C-α) | 0.01 | " |

It is apparent from the results shown in Table 2 that an improved effect can be obtained by the present invention, and similar results to those obtained by Example 9 can be obtained by the layer structure of Example 10.

EXAMPLE 11

The light-sensitive materials obtained in Example 9 were tested in the same manner as in Example 9 except that the following processing was carried out with the following processing solutions.

After the light-sensitive materials were imagewise exposed to light, the materials were subjected to continuous processing (running test) in the following stages by using a paper processor until the replenishment rate of the color developing solution reached twice the capacity of the tank.

| Processing Stage | Temp. (°C.) | Time (sec) | Replenisher* (ml) | Tank Capacity (liter) |
| --- | --- | --- | --- | --- |
| Color Development | 35 | 45 | 161 | 17 |
| Bleach-Fixing | 35 | 45 | 215 | 17 |
| Rinse (1) | 35 | 20 | — | 10 |
| Rinse (2) | 35 | 20 | — | 10 |
| Rinse (3) | 35 | 20 | — | 10 |
| Rinse (4) | 35 | 20 | 248 | 10 |
| Drying | 80 | 60 | | |

*Replenishment rate being per m² of the light-sensitive material.
(Four tank countercurrent system of from rinse (4) to rinse (1).)

Each processing solution had the following composition.

| | Tank Solution | Replenisher |
| --- | --- | --- |
| Color Developing Solution | | |
| Water | 800 ml | 800 ml |
| Lithium Polystyrenesulfonate Solution (30%) | 0.25 ml | 0.25 ml |
| 1-Hydroxyethylidene-1,1-diphosphonic Acid (60%) | 0.8 ml | 0.8 ml |
| Lithium Sulfate (anhydrous) | 2.7 g | 2.7 g |
| Triethanolamine | 8.0 g | 8.0 g |
| Potassium Chloride | 1.8 g | — |
| Potassium Bromide | 0.03 g | 0.025 g |
| Diethylhydroxylamine | 4.6 g | 7.2 g |
| Glycine | 5.2 g | 8.1 g |
| Threonine | 4.1 g | 6.4 g |
| Potassium Carbonate | 27 g | 27 g |
| Potassium Sulfite | 0.1 g | 0.2 g |
| N-Ethyl-N-(β-methanesulfon-amidoethyl)-3-methyl-4-amino-aniline 3/2 Sulfate Monohydrate | 4.5 g | 7.3 g |
| Fluorescent Brightener (4,4'-diaminostilbene type) | 2.0 g | 3.0 g |
| Add water to make | 1,000 ml | 1,000 ml |
| pH (adjusted with potassium hydroxide and sulfuric acid) | 10.12 | 10.70 |
| Bleach-Fixing Solution | | |
| Tank solution and replenisher being the same. | | |
| Water | 400 ml | |
| Ammonium Thiosulfate (700 g/liter) | 100 ml | |
| Sodium Sulfite | 17 g | |
| Ammonium Ethylenediaminetetraacetato Ferrate | 55 g | |
| Disodium Ethylenediaminetetraacetate | 5 g | |
| Glacial Acetic Acid | 9 g | |
| Add Water to make | 1,000 ml | |
| pH (25° C.) | 5.40 | |
| (adjusted with acetic acid and ammonia) | | |
| Stabilizing Solution | | |
| Tank solution and replenisher being the same. | | |
| 1,2-Benzisothiazoline-3-one | 0.02 g | |
| Polyvinyl Pyrrolidone | 0.05 g | |
| Add Water to make | 1,000 ml | |
| pH | 7.0 | |

Similar results to those obtained in Example 9 were obtained by using the processing solutions of Example 11.

It will be understood from the above disclosure that when the compounds represented by formula (I) are used, silver halide photographic materials having excellent storage stability can be obtained, and particularly a change in sensitivity after the preparation of the coating solution with the passage of time can be reduced.

While the present invention has been described in detail and with reference to specific embodiments thereof, it is apparent to one skilled in the art that various changes and modifications can be made therein without departing from the spirit and the scope of the present invention.

What is claimed is:

1. A silver halide photographic material comprising a support having thereon at least one light-sensitive silver halide emulsion layer, which comprises at least one methine compound represented by the following formula (II):

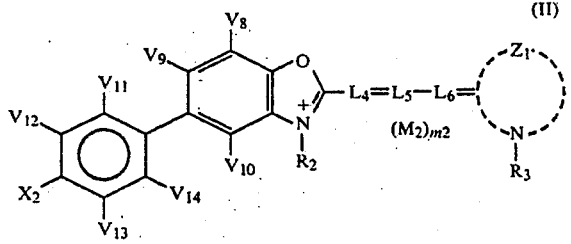

(II)

wherein $R_2$ and $R_3$ each represent a sulfoalkyl group having from 2 to 5 carbon atoms; $Z_1$ represents a benzoxazole nucleus; $V_8$, $V_9$, $V_{10}$, $V_{11}$, $V_{12}$, $V_{13}$ and $V_{14}$ each represent a hydrogen atom; $X_2$ represents a chlorine atom or a bromine atom; $L_4$, $L_5$ and $L_6$ are the same or different and each represents a methine group; $M_2$ represents an ion for neutralizing charge; and $m_2$ represents a number of 0 or more necessary for neutralizing the molecular charge.

2. The silver halide photographic material as claimed in claim 1, wherein (a) the silver halide photographic material comprises a support having thereon at least one silver halide emulsion layer having a silver chloride content of 90 mol % or more, and (b) a silver halide emulsion contained in at least one layer of the silver halide emulsion layers having a silver chloride content of 90 mol % or more comprises at least one of the methine compounds represented by formula (II).

3. The silver halide photographic material as claimed in claim 1, wherein the silver halide photographic material comprises at least one compound represented by formula (II) and at least one compound represented by the following formula (III)

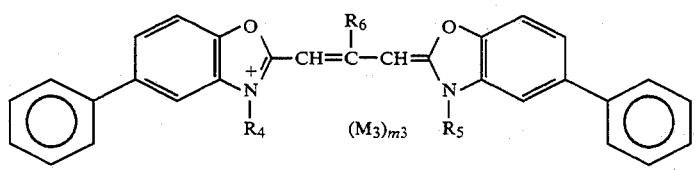

(III)

wherein
$R_4$ and $R_5$ are the same or different and each represents an alkyl group;

$R_6$ represents a hydrogen atom or an alkyl group; $M_3$ represents an ion for neutralizing charge; and $m_3$ represents a number of 0 or more necessary for neutralizing the molecular charge.

4. The silver halide photographic material as claimed in claim 1, wherein $M_1$ is selected from the group consisting of a sodium ion, a potassium ion, a triethylammonium ion, a pyridinium ion, a tetraethylammonium ion, an ethylpyridinium ion and a methylpyridinium ion.

5. The silver halide photographic material as claimed in claim 1, wherein the compound represented by formula (II) is used in an amount of from $4 \times 10^{-6}$ to $8 \times 10^{-2}$ mol per mol of silver halide.

6. The silver halide photographic material as claimed in claim 1, wherein $L_4$, $L_5$ and $L_6$ are each a methine group substituted by an alkyl group.

7. The silver halide photographic material as claimed in claim 1, wherein $M_2$ is selected from the group consisting of a sodium ion, a potassium ion, a triethylammonium ion, a pyridinium ion, a tetraethylammonium ion, an ethylpyridinium ion and a methylpyridinium ion.

8. The silver halide photographic material as claimed in claim 1, wherein a nucleus formed by $Z_1$ is selected from the group consisting of a thiazole nucleus, a thiazoline nucleus, an oxazole nucleus, an oxazoline nucleus, a selenazole nucleus, a selenazoline nucleus, a quinoline nucleus, a tellurazole nucleus, an imidazole nucleus, a pyridine nucleus, an imidazo[4,5-b]quinoxaline nucleus, an oxadiazole nucleus, a thiadiazole nucleus, a tetrazole nucleus and a pyrimidine nucleus.

9. The silver halide photographic material as claimed in claim 1, wherein $Z_1$ is 5-phenylbenzoxazole, 5-(4-chlorophenyl)benzoxazole or 5-(4-bromophenyl)benzoxazole.

10. The silver halide material as claimed in claim 1, wherein $L_4$, $L_5$, and $L_6$ are each an unsubstituted methine group.

* * * * *